United States Patent [19]

Ko

[11] Patent Number: 5,751,884
[45] Date of Patent: May 12, 1998

[54] HIGH-RESOLUTION VIDEO TAPE RECORDER SYSTEMS AND METHODS FOR RECORDING AND RECOVERING VIDEO COMPATIBLY WITH THE NORMAL-VHS FORMAT SYSTEM

[75] Inventor: Jung Wan Ko, Lawrenceville, N.J.

[73] Assignee: SamSung Electronics Co., Ltd., Suwon, Rep. of Korea

[21] Appl. No.: 25,758

[22] Filed: Mar. 3, 1993

Related U.S. Application Data

[63] Continuation-in-part of Ser. No. 636,440, Dec. 31, 1990, abandoned.

[30] Foreign Application Priority Data

Dec. 30, 1989 [KR] Rep. of Korea ............... 1989-20595

[51] Int. Cl.$^6$ ............... H04N 11/02; H04N 9/79
[52] U.S. Cl. ............... 386/33; 386/34; 386/40
[58] Field of Search ............... 358/310, 328, 358/330, 335, 342; 348/424, 427, 392; 386/33, 273, 109, 31, 34, 40, 37, 46, 124; 360/32; H04N 11/02, 9/79

[56] References Cited

U.S. PATENT DOCUMENTS

| | | |
|---|---|---|
| 4,621,286 | 11/1986 | Reitmeier, et al. . |
| 4,656,527 | 4/1987 | Uchimi ............... 358/320 |
| 4,660,072 | 4/1987 | Fukinuki . |
| 4,742,386 | 5/1988 | Wilkinson . |
| 4,745,460 | 5/1988 | Fukinuki . |
| 4,870,481 | 9/1989 | Kawamata . |
| 4,885,631 | 12/1989 | Fukinuki et al. . |
| 4,910,605 | 3/1990 | Sasaki et al. ............... 358/310 |
| 4,943,848 | 7/1990 | Fukinuki . |
| 4,963,991 | 10/1990 | Honjo . |
| 4,963,992 | 10/1990 | Doi et al. ............... 358/335 |
| 4,984,093 | 1/1991 | Schmidtmann et al. . |
| 5,031,030 | 7/1991 | Hurst, Jr. . |
| 5,063,457 | 11/1991 | Ishikawa et al. . |
| 5,113,262 | 5/1992 | Strolle et al. . |
| 5,130,796 | 7/1992 | Isobe et al. ............... 348/424 |
| 5,182,642 | 1/1993 | Gersdorff et al. . |
| 5,444,546 | 8/1995 | Fujimoto ............... 358/335 |

OTHER PUBLICATIONS

Journal of British I.R.E. on "Reduction of Television Bandwidth by Frequency–Interlace", Feb. 1960, pp. 127–136 (disclosed by Howson and Bell).

"Develpment of HDTV Receiving Equipment Based On Band Compression Technique", by Isao Nakagawa et al., *IEEE Transactions on Consumer Electronics*, vol. CE–32, No. 4, Nov.

*Primary Examiner*—Robert Chevalier
*Attorney, Agent, or Firm*—Robert E. Bushnell, Esq.

[57] ABSTRACT

A high-resolution video tape recorder system is disclosed which is compatible with a conventional VHS format VTR and obtains an image signal for a high quality picture by double sampling a luminance signal component of the composite video signal and then separating those samples into first and second sub-Nyquist sampled luminance signal components interleaved in spatial phasing. These separated luminance signal components are respectively frequency-multiplexed together with opposite phases of color-under signal to be recorded on and played back from first and second parallel subtracks formed on the video tape within a standard track width.

25 Claims, 10 Drawing Sheets

HIGH-RESOLUTION VIDEO TAPE RECORDER SYSTEMS AND METHODS FOR RECORDING AND RECOVERING VIDEO COMPATIBLY WITH THE NORMAL-VHS FORMAT SYSTEM

This is a continuation-in-part of U.S. patent application Ser. No. 07/636,440 filed Dec. 31, 1990 now abandoned.

BACKGROUND OF THE INVENTION

The present invention relates to a system which plays back an image recorded in a magnetic medium, and more particularly to a system which is capable of reproducing a high-resolution image while maintaining compatibility with a video tape recorder system (hereinafter VTR) that uses an existing VHS method or satisfies an existing standard. Usually, a VTR records magnetic responses to a composite video signal together with accompanying audio signal on a magnetic tape and plays such signals back. The invention relates to the recording and playback of the composite video signal, and the recording and playback of the accompanying audio signal is assumed to be done in one of the ordinary ways. The invention relates still more particularly to the problem of recording the luminance signal component of the composite video signal with higher resolution than is possible when recording in accordance with the normal VHS standard. The resolution of a television image in the horizontal direction can be measured in terms of equivalent vertical resolution expressed in scan lines.

A conventional VTR using a VHS format will be described in greater detail further on in this specification in the detailed description of FIGS. 1 and 2 of the drawing. In such a VTR a recording bandwidth for the luminance signal is about 3 MHz, or about 220 lines of horizontal resolution. It is well known that a picture quality is poor in a picture using 220 lines of resolution, i.e., about ⅔ of the 300 lines of horizontal resolution of a broadcasting signal. To improve the resolution, a super VHS format (S-VHS) accomplishes high resolution by recording a wider bandwidth for the luminance signal than is done in conventional VHS recording. To record a wider bandwidth luminance signal, a higher frequency luma carrier is used, so super VHS is not compatible with the normal VHS format. Also, because of the higher carrier frequency which results in a shortened recording wavelength, a higher quality recording medium (e.g., better tape) has to be used.

Alternatively, a recording method which compresses the bandwidth of a signal can be used. In such a method, it is not possible to recover the signal completely, and there is degradation of picture quality during playback of a moving frame since the frame is under-sampled—that is, sampled at less than Nyquist rate.

The problem, then, is to provide a recording method in which each frame of video signal with 300 lines of horizontal resolution is fully sampled at or above Nyquist rate, which recording method produces video tapes that can be played back on VTRs designed for the normal VHS format.

SUMMARY OF THE INVENTION

The invention enables the construction of a high-resolution videotape recorder system which splits a conventional recording track into equal-width subtracks and can be made compatible with the existing VTR systems using the normal VHS standard. In accordance with an aspect of the invention, a novel method of video tape recording is used wherein a composite video signal has its wideband luminance signal separated into sub-Nyquist sampled portions, for recording on respective ones of the subtracks.

A high-resolution video tape recorder system constructed in accordance with another aspect of the invention records in a magnetic recording medium (such as video tape) magnetic responses to a composite video signal on first and second subtracks of successive field tracks having a field track width, and picks up from said magnetic recording medium electrical responses to the magnetic responses to the composite video signal recorded in those first and second subtracks. The first and second subtracks have respective widths each substantially one-half of the width of field tracks. The composite video signal is descriptive of line-by-line scanning of a television image field at a line scan rate, the successive scanning lines of each television image frame being identified for purpose of this description by consecutive ordinal numbers. Luma/chroma separating means separates the composite video signal into a luminance signal and a chrominance signal. By downconversion from the chrominance signal, chrominance signal converting means generate a first color-under signal and a second color-under signal in phasing opposite to that of said first color-under signal.

The luminance signal is sampled according to a first sampling clock signal supplied at a rate at least the Nyquist rate for the luminance signal, but not as much as twice the Nyquist rate, thereby to obtain an integral number of samples per scan line. For purpose of description the luminance samples in each line can be identified, in order of their being successively scanned, by consecutive ordinal numbers beginning with first. Samples identified by the same ordinal number are arranged within the television image fields in a line transverse to the nominal horizontal direction of scanning lines.

Odd-numbered samples from odd-numbered scan lines and even-numbered samples from even-numbered scan lines are separated at the times those samples sequentially occur during the scanning of odd-numbered television image frames, and even-numbered samples from odd-numbered scan lines and odd-numbered samples from even-numbered scan lines are separated at the times those samples sequentially occur during the scanning of even-numbered television image frames, for generating a first sub-Nyquist sampled luminance signal. First modulating means generate a first modulated signal in accordance with the first sub-Nyquist sampled luminance signal. The first modulated signal has frequencies above those of the first color-under signal, with which it is frequency-multiplexed for generating a first subtrack video signal. Using a rotating headwheel assembly having a first plurality of heads with gaps alternating (in accordance with a first gap phasing sequence) between a first azimuth angle and a second azimuth angle from one field scan to the next, magnetic response to the first subtrack video signal is recorded in the first subtracks of field tracks in the magnetic recording medium.

Even-numbered samples from odd-numbered scan lines and odd-numbered samples from even-numbered scan lines are separated at the times those samples sequentially occur during the scanning of odd-numbered television image frames, and odd-numbered samples from odd-numbered scan lines and even-numbered samples from even-numbered scan lines are separated at the times those samples sequentially occur during the scanning of odd-numbered television image frames, for generating a second sub-Nyquist sampled luminance signal. Second modulating means generate a second modulated signal in accordance with the second sub-Nyquist second luminance signal. The second modulated signal has frequencies above those of the second color-under signal, with which it is frequency-multiplexed for generating a second subtrack video signal. Using a rotating headwheel assembly also having a second plurality of heads with gaps alternating (in accordance with a second gap phasing sequence in staggered phasing with said first gap phasing sequence) between a first azimuth angle and a second azimuth angle from one field scan to the next, magnetic response to the second subtrack video signal is recorded in the second subtracks of field tracks in the magnetic recording medium.

A first demodulator responds to a reproduced first subtrack video signal, picked up during playback from the first subtrack in the magnetic recording medium by a plurality of heads in the rotating headwheel assembly having gaps alternating in accordance with the first gap phasing sequence, for reproducing the first sub-Nyquist sampled luminance signal as a first reproduced sub-Nyquist sampled luminance signal and for reproducing the chrominance signal in a first phasing as a first reproduced chrominance signal. The first demodulator is of a type separating a reproduced first color-under signal from the first subtrack video signal, generating the first reproduced chrominance signal from the first color-under signal by upconversion thereof, separating the reproduced first modulated signal from the first subtrack video signal, and detecting from the reproduced first modulated signal the first reproduced sub-Nyquist sampled luminance signal.

A second demodulator responds to a reproduced second subtrack video signal, picked up during playback from the second subtrack in the magnetic recording medium by a plurality of heads in the rotating headwheel assembly having gaps alternating in accordance with the second gap phasing sequence, for reproducing the second sub-Nyquist sampled luminance signal as a second reproduced sub-Nyquist sampled luminance signal and for reproducing the chrominance signal in a second phasing as a second reproduced chrominance signal. The first and second phasings the chrominance signal is reproduced in are opposite to each other. The second demodulator is of a type separating a reproduced second color-under signal from the second subtrack video signal, generating the second reproduced chrominance signal from the second color-under signal by upconversion thereof, separating the reproduced second modulated signal from the second subtrack video signal, and detecting from the reproduced second modulated signal the second reproduced sub-Nyquist sampled luminance signal.

Multiplexing means reproduce the luminance signal by alternately sampling the first reproduced sub-Nyquist sampled luminance signal and the second reproduced sub-Nyquist sampled luminance signals according to a second sampling clock signal. Means are provided for generating a combined response to the first reproduced chrominance signal and the second reproduced chrominance signal, in which combined response respective component responses to the first reproduced chrominance signal and to the second reproduced chrominance signal combine constructively. Means are provided for reproducing the composite video signal, by combining the reproduced luminance signal from the multiplexing means with the combined response to the first reproduced chrominance signal and the second reproduced chrominance signal.

Other aspects of the invention are embodied in particular portions of the foregoing high-resolution video tape recorder system.

BRIEF DESCRIPTION OF THE DRAWING

For a better understanding of the invention, reference is made, by way of example, to the accompanying drawing, in which.

DETAILED DESCRIPTION

Figure 1:
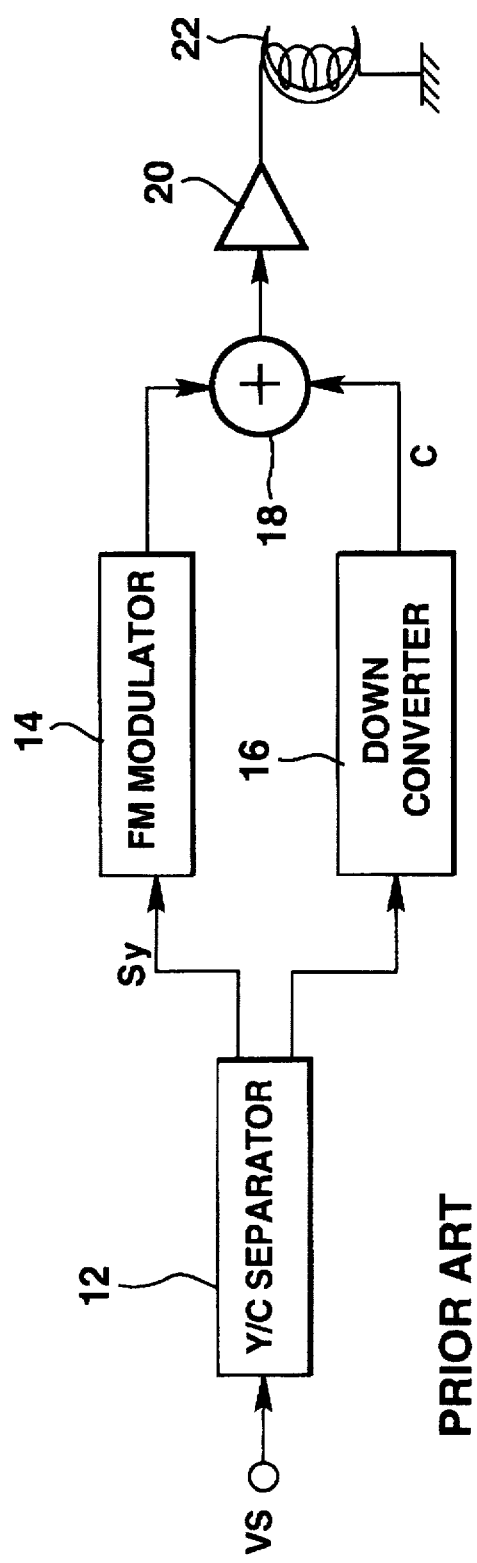
FIG. 1 is a block diagram of recording circuitry for a video tape recorder system, as known in the prior art.

FIG. 1 shows the image recording portions of a conventional VHS VTR. A composite video signal VS descriptive of television images is supplied to a luminance/chrominance separator (hereinafter Y/C separator) 12 which generates as separated signals, a luminance signal Sy and a chrominance signal Sc. The luminance signal Sy is fed to a frequency modulator 14 to control the frequency modulation of a luminance carrier, and the chrominance signal Sc is fed to a downconverter 16 for translating the quadrature amplitude-modulation sidebands downward in frequency to generate a complex amplitude-modulation (AM) color-under signal reposing in a relatively low-frequency band below the relatively high-frequency band in which the frequency-modulation (FM) sidebands of the luminance carrier repose. An output terminal of the frequency modulator 14 and an output terminal of the downconverter 16 are connected to supply input signals to an additive mixer 18 for frequency-multiplexing the FM signal the modulator 14 generates by frequency-modulating the luminance carrier in accordance with the luminance signal Sy and the AM color-under signal the downconverter 16 supplies in response to the chrominance signal Sc. The frequency-multiplexed signal is fed to a recording amplifier 20. Recording amplifier 20 amplifies the signal from the additive mixer 18 by a prescribed level and inputs the amplified signal to a recording head 22 to record in the magnetic tape which is not shown in FIG. 1. While a single recording head 22 is shown in FIG. 1, the head 22 can be considered to represent the one of a plurality of recording heads that is currently recording magnetic response to the recording amplifier 20 output signal.

A system as in FIG. 1 typically uses the helical scanning method with two recording heads mounted diametrically opposite each other on the rim of a headwheel which completes one revolution during a frame time, with the head rotation being synchronized such that each head scans across the tape during a field interval and transfer between scanning by one head and the other takes place during field retrace intervals. The recording head 22 then represents the one of a plurality of recording heads mounted on a headwheel (not shown) that is currently recording magnetic response to the recording amplifier 20 output signal. The gap in each alternate one of the recording heads has a first azimuth angle $\alpha 1$, and the gap in each other alternate one of the recording heads has a second azimuth angle $\alpha 2$. The azimuth angles $\alpha 1$ and $\alpha 2$ are equal in magnitude and opposite in polarity respective to each other, as referred to the direction of tape motion. The two recording heads are used as playback heads also in VTRs made for the home market. In 2-head VTRs that have long-play capability, the widths of the heads are a compromise, having effective width narrower than the 58 mm. wide field tracks used for short-play and wider than the 19 mm. wide field tracks used for long-play.

In 4-head VTRs made for the home market, first and second heads with respective azimuth angles $\alpha 1$ and $\alpha 2$ are used as described above, but having effective widths that span the 58 mm. wide field tracks used for short-play. Additionally third and fourth heads having effective widths that span the 19 mm. wide field tracks used for long-play and having gaps with respective azimuth angles $\alpha 1$ and $\alpha 2$ are mounted diametrically opposite each other on the rim of the headwheel, with the third and fourth heads close to the second and first heads, respectively. This arrangement allows viewable pictures to be played back at twice normal tape speeds.

Figure 2:
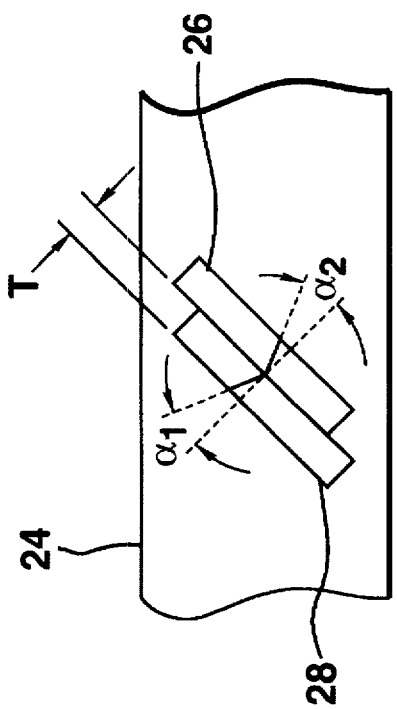
FIG. 2 is a recording state diagram of a magnetic video tape as recorded by the FIG. 1 recording circuit and known in the prior art.

FIG. 2 displays a magnetic tape as used in the system of FIG. 1. A track width T in FIG. 2 is the same as the track width of the recording head 22 of FIG. 1. The leftmost of the two tracks 26 and 28 records an odd-numbered field, with the azimuth angle of the gaps of the head used to record it and play back from it being the first azimuth angle $\alpha 1$; and the rightmost of the two tracks 26 and 28 records an even-numbered field, with the azimuth angle of the gaps of the head used to record it and play back from it being the second azimuth angle $\alpha 2$.

In recording methods embodying aspects of the invention, each of the field tracks (such as 26 and 28) is split into two equal subtracks, a first of the subtracks being recorded conventionally, except for the luminance signal being processed before being used to modulate the frequency of the luma subcarrier. It is this first subtrack that can be played back on VTRs designed for the normal VHS format with some loss in signal-to-noise ratio owing to the reduction in effective trackwidth. The second subtrack is recorded with recording heads the gaps of which in preferred embodiments of the invention are at azimuth angle(s) other than either of the azimuth angles $\alpha 1$ and $\alpha 2$, so VTRs designed for the normal VHS format are essentially non-responsive to the magnetic recording contained in the second subtrack.

Figure 3:
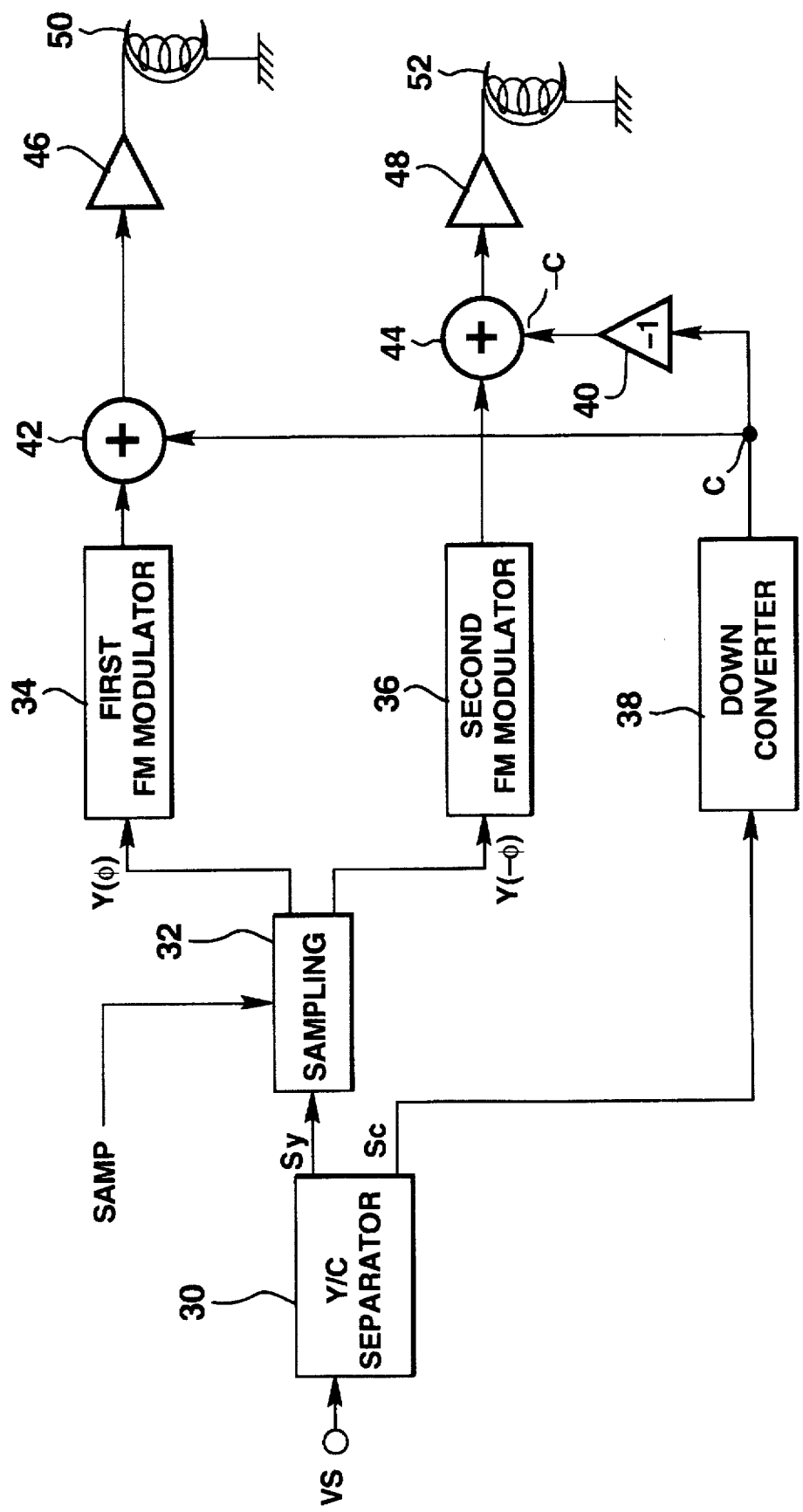
FIG. 3 is a block diagram of video tape recording circuitry constructed in accordance with an aspect of the invention.

FIG. 3 shows apparatus included in a VTR for recording in accordance with the invention. Assuming a composite video signal VS (as can be obtained from broadcast or cable television using a partial television receiver included in the VTR) is offered for recording, a Y/C separator 30 responds to the composite video signal VS to separate therefrom a luminance signal Sy and a chrominance signal Sc as output signals. A conventional comb-filter can be used as the Y/C separator 30.

A sampler 32 samples the luminance signal Sy from the luma/chroma separator 30, selecting a first set of Sy samples as a first sub-Nyquist sampled luminance signal $Y(\phi)$, and selecting a second set of alternate Sy samples as a second sub-Nyquist sampled luminance signal $Y(-\phi)$. These first and second sets of Sy samples are interleaved in spatial phasing in both the horizontal and vertical directions within each television image field, and are formed by the sampler 32 sub-Nyquist sampling the luminance signal in the time domain. That is, according to a given sampling clock SAMP, the sampler 32 selects alternate samples of Sy to generate the first sub-Nyquist sampled luminance signal $Y(\phi)$ and selects intervening alternate samples of Sy to generate the second sub-Nyquist sampled luminance signal $Y(\phi)$, with a one-pixel horizontal offset from scan line to scan line in the selecting procedure.

The sampling clock SAMP rate is chosen to be at least the Nyquist rate for the luminance signal. The sampling clock SAMP can be restarted each horizontal scan line. The pixels in each scan line, the scan lines in each image frame, and the successive image frames can each be counted modulo-two. The three counts can then be added modulo-two to determine which of the first and second sub-Nyquist sampled luminance signals $Y(\phi)$ and $Y(-\phi)$ each pixel is to be selected to. By choosing the sampling clock SAMP to be a multiple of the horizontal scan line rate, the number of luminance pixels per scan line is an integral number. The timing of the sampling clock SAMP is ordinarily determined by an automatically-frequency-and-phase-controlled oscillator when digitizing a composite video signal or a luminance signal. Choosing the sampling clock SAMP to be an even multiple of the horizontal scan line rate causes the number of luminance pixels per scan line is an even integral number. This can simplify line-locking the AFPC'd oscillator to synchronizing pulses separated from the composite video signal or from the luminance signal, since frequency division of the oscillator output signal to generate feedback signal for comparing with separated sync pulses involves frequency dividing by even numbers, which is easier to implement than frequency dividing by odd numbers.

By choosing the sampling clock SAMP to be an odd multiple of the horizontal scan line rate, the number of luminance pixels per scan line is odd; and throughout field scan the sampler 32 can select alternately occurring samples of the luminance signal Sy to generate the first and second sub-Nyquist sampled luminance signals $Y(\phi)$ and $Y(-\phi)$, without the need for counting scan lines. The one-pixel horizontal offset from scan line to scan line occurs as a matter of course. The remainder of this specification presumes the sampling clock SAMP having been chosen to be an odd multiple of the horizontal scan line rate.

A first FM modulator 34 and a second FM modulator 36 generate FM modulated signals with given signal bandwidth from the sub-Nyquist sampling luminance signals $Y(\phi)$ and $Y(-\phi)$ which are generated by the sampler 32. The FM modulators 34 and 36 are similar in their individual structures to the FM modulator 14 shown in the FIG. 1 prior-art VTR that records in the existing normal VHS format. The FM modulators 34 and 36 each modulate the frequency of a respective luma carrier in accordance with a respective input signal by a modulating method as used in the conventional VHS VTR, and each luma carrier is of the same frequency as used in the normal VHS recording standard. A downconverter 38 generates a first color-under signal C by translating the chrominance signal Sc from the Y/C separator 30, which occupies a high-frequency band centered at 3.58 MHz, to the color-under signal band centered at 629 kHz. This downconversion corresponds to the downconverter 16 generating a color-under signal from the separated chrominance signal from the Y/C separator 12 in the FIG. 1 prior-art VTR. A phase-inverting amplifier 40 generates a second color-under signal -C in inverted response to the first color-under signal C from the downconverter 38. A first additive mixer 42 frequency-multiplexes the modulated signal from the first FM modulator 34 with the first color-under signal C to generate a first frequency-multiplexed output signal, and the second additive mixer 44 frequency-multiplexes the modulated signal from the second FM modulator 36 with the second color-under signal -C to generate a second frequency-multiplexed output signal. Recording amplifiers 46 and 48 amplify the first and second frequency-multiplexed output signals from the additive mixers 42 and 44, respectively, and then supply the amplified signals to a first subtrack recording head 50 as a first subtrack signal and to a second subtrack recording head 52 as a second subtrack signal.

Figure 4:
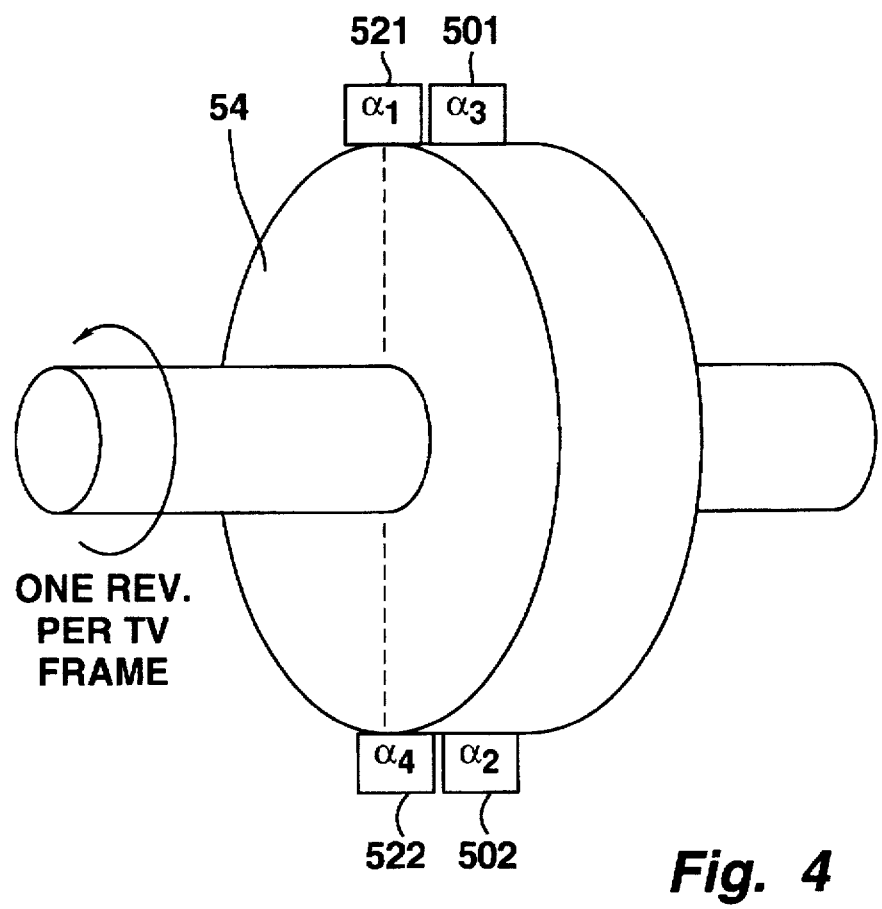
FIG. 4 is a diagram of a headwheel assembly with four heads arranged for helically scanning first and second subtracks of field tracks on a magnetic recording tape when recording them or playing them back in accordance with the invention.

FIG. 4 diagrams a headwheel assembly that can be used together with the FIG. 3 recording circuitry in a VTR embodying the invention. On the right half of its rim, a headwheel 54 has a pair of first subtrack heads 501 and 502 mounted thereon, diametrically opposite each other. The first subtrack heads 501 and 502 cyclically scan the first subtrack portions of successive field tracks and have gaps at a first azimuth angle and a second azimuth angle, respectively. The first and second azimuth angles are oppositely inclined respective to the direction transverse to field track direction, +6° and -6° being standard. The first subtrack head 50 in FIG. 3 represents the one of the first subtrack heads 501 and 502 that is currently recording magnetic response to the first subtrack signal.

On the left half of its rim, the headwheel 54 has a pair of second subtrack heads 521 and 522 mounted thereon, diametrically opposite each other. Preferably, the pair of second subtrack heads 521 and 522 are mounted on the rim of the headwheel 54 parallel to the first subtrack heads 501 and 502, respectively. The second subtrack head 52 in FIG. 3 represents the one of the second subtrack heads 521 and 522 that is currently recording magnetic response to the second subtrack signal. The first subtrack recording heads and the second subtrack recording heads are each constructed for recording a subtrack having one-half the width of the track recorded by the conventional VHS method. The second subtrack heads 521 and 522 have gaps at a third azimuth angle and at a fourth azimuth angle, respectively. The third and fourth azimuth angles do not necessarily need to be different from each other, but each should be different from both the first and second azimuth angles.

A difference of at least 12° of each of the third and fourth azimuth angles from each of the first and second azimuth angles would keep the rejection of the second subtracks as good as the rejection of adjacent field tracks when playing back with a conventional VCR designed to play back signals recorded according to normal VHS format. Such high rejection of adjacent field tracks is primarily to avoid crosstalk in the color-under signals, however, since color is quite sensitive to small phase errors. Crosstalk of the FM luma carrier from an adjacent field track into the FM luma carrier from the field track intended to be scanned is much less serious a problem, since the capture phenomenon associated with the limiting of the FM luma carrier prior to its detection suppresses response to the FM luma carrier from an adjacent field track. The preferred mounting of the second subtrack heads 521 and 522 parallel to the first subtrack heads 501 and 502, respectively, on the rim of the headwheel 54 causes the ones 50, 52 of those heads currently scanning the field track to record or play back the first and second subtracks in parallel. This disposition of the heads 501, 502, 521 and 522 results in parallel recording and subsequent playback of the first and second subtracks, which maintains relative timebase stability both between the first and second sub-Nyquist sampled luminance signals Y(φ) and Y(-φ) and between the first and second color-under signals C and -C throughout that recording and subsequent playback procedure. Since the color-under signals are in anti-phase in the first and second subtracks of the same field track, crosstalk between the color-under signals in the first and second subtracks does not affect chroma phase very much. A difference of at least 12° of each of the third and fourth azimuth angles from the one of the first and second azimuth angles used for recording the adjacent field track is preferable, but the difference from the other of the first and second azimuth angles need not be so great. Third and fourth azimuth angles of +12° and -12° are suitable, by way of example. Arranging the second subtrack recorded with a head having a gap at +12° to be next to the first subtrack recorded with a head having a gap at +6° in the same field, and arranging the second subtrack recorded with a head having a gap at -12° to be next to the first subtrack recorded with a head having a gap at -6° in the same field, provides better rejection of cross-talk from the color-under signal in the adjacent field track than is available in normal VHS recording.

Figure 5:
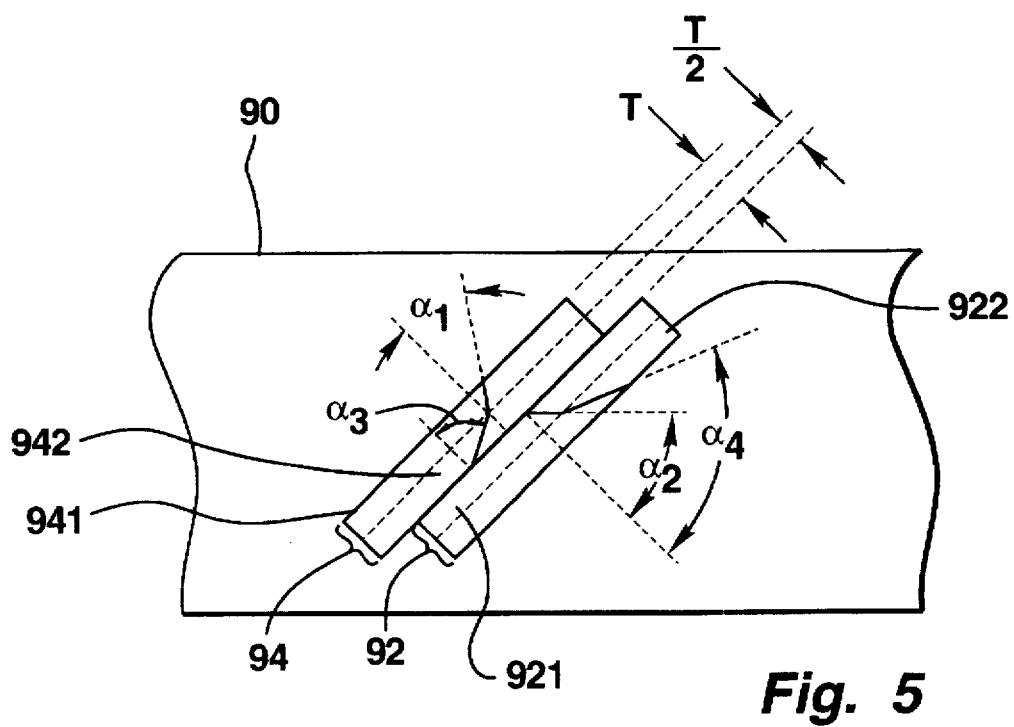
FIG. 5 is a recording state diagram of a magnetic video tape recorded in accordance with the invention, using the FIG. 3 recording circuitry and FIG. 4 headwheel assembly.

FIG. 5 shows a recording state as produced by the first subtrack recording heads 501 and 502 and by the second subtrack recording heads 521 and 522 of the FIG. 4 headwheel assembly. Magnetic tape 90 has tracks 92 and 94 which record an even field video signal and an odd field video signal respectively. A first subtrack 921 is recorded by head 501 with gap azimuth angle α1, and a second subtrack 922 is recorded by head 521 with gap azimuth angle α3. The subtracks 921 and 922 are both of a width T/2 and are provided by splitting one recording track 92 with conventional track width T. A first subtrack 941 is recorded by head 502 with gap azimuth angle α2, and a second subtrack 942 is recorded by head 522 with gap azimuth angle α4. The subtracks 941 and 942 are both of a width T/2 and are provided by splitting one recording track 94 with conventional track width T.

In the invention, the same-frequency FM luma carrier is used as is used in the conventional VHS format. Since the first and second sub-Nyquist sampled luminance signals are interleaved with each other in spatial phasing, both in the vertical direction and in the horizontal direction, for recording on subtracks within the confines of the standard field track width for VHS recording, it is possible to recover the video signal using the VTR of the conventional VHS format. The switched heads used in a conventional VHS VTR to play back successive field tracks have gaps with opposite azimuth angles as referred to a perpendicular to the field track direction, so each head has substantial response to only the first subtrack, to recover color-under signal in conventional phasing and the associated half-band luminance signal from that single subtrack.

Figure 6:
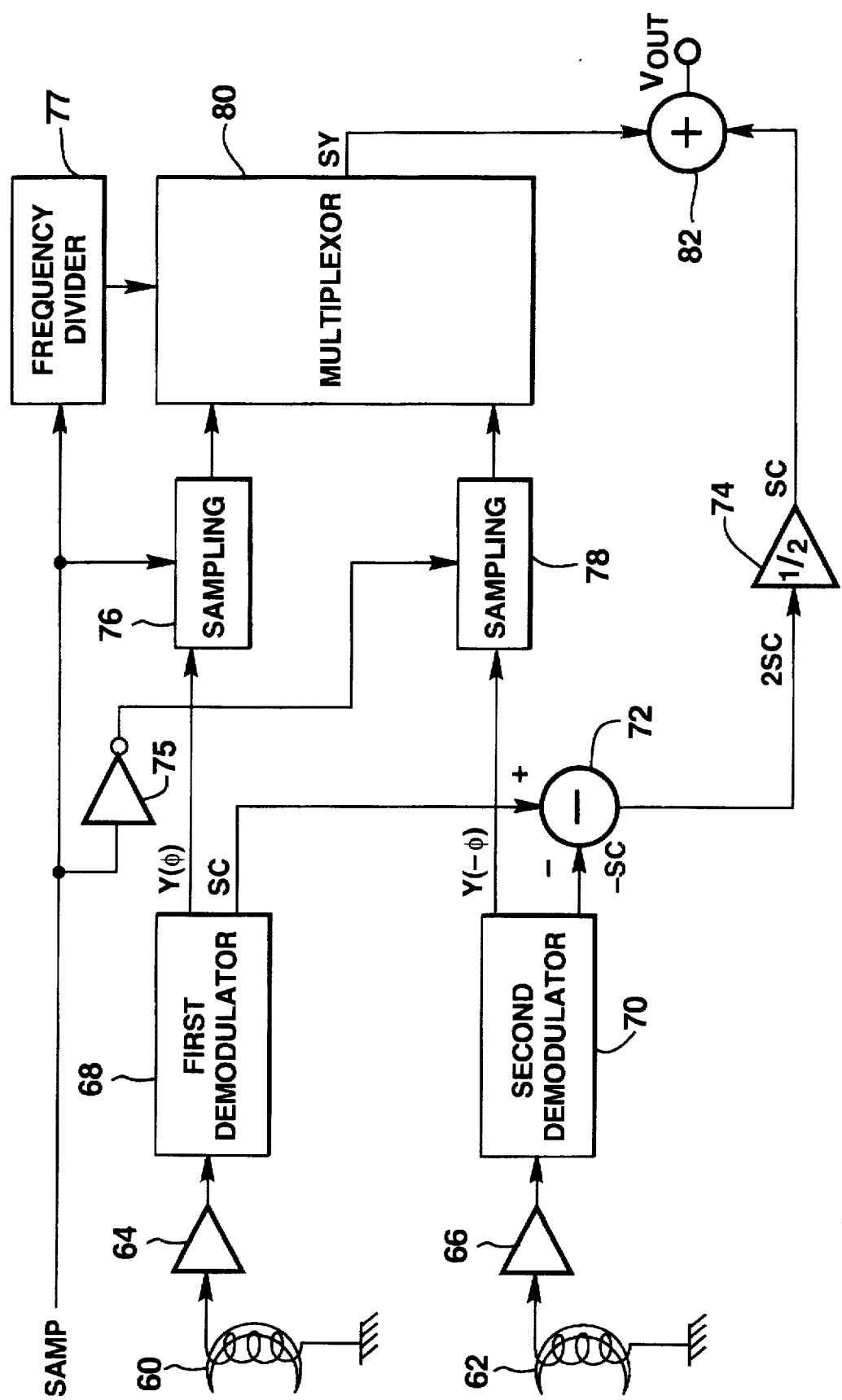
FIG. 6 is a block diagram of a video tape playback circuitry constructed in accordance with an aspect of the invention.

FIG. 6 shows playback circuitry for recovering a composite video signal with a luminance signal component that is full-bandwidth in nature. In the FIG. 6 playback circuitry, a head 60 represents the one of the heads 501 and 502 currently responding to magnetic fluctuations recorded on the first subtrack to reproduce the previously recorded first subtrack signal, and a head 62 represents the one of the heads 521 and 522 currently responding to magnetic fluctuations recorded on the second subtrack to reproduce the previously recorded second subtrack signal. Playback amplifiers 64 and 66 respond to the reproduced first and second subtrack signals from the heads 60 and 62, respectively, to amplify them to a prescribed level for application to demodulators 68 and 70, respectively. Each of the demodulators 68 and 70 can be similar in its construction to the demodulator used to demodulate the luminance signal and the chrominance signal in a prior-art VHS VTR. The first demodulator 68 demodulates the output from the playback amplifier 64 to reproduce the first sub-Nyquist sampled luminance signal Y($\phi$) and a chrominance signal Sc upconverted from the first color-under signal C. The second demodulator 70 demodulates the output from the playback amplifier 66 to reproduce the second sub-Nyquist sampled luminance signal Y($-\phi$) and a chrominance signal $-$Sc upconverted from the second color-under signal $-$C. A subtractor 72 supplies a double-amplitude chrominance signal 2Sc in differential response to the chrominance signals from the first demodulator 68 and from the second demodulator 70. The doubled chrominance signal 2Sc is halved by a scaling amplifier 74 to generate a chrominance signal Sc for application to an additive mixer 82. In digital implementations of the circuitry, the scaling amplifier 74 is replaced by a wired binary-place shift that halves the signal 2Sc.

The elements 72 and 74 operate to average the energy in the chrominance signal recovered from the first subtrack with the energy in the chrominance signal recovered from the second subtrack. This averaging process differentially combines the anti-phase chrominance signal phasors in the two subtracks, to sum them in-phase so their respective energies are fully correlated. The accompanying noise phasors being uncorrelated in the two subtracks combine in quadrature phase. So, the signal-to-noise ratio of the chrominance signal Sc supplied to the additive mixer 82 is improved by 3 dB over the signal-to-noise ratio of the chroma from just one subtrack, resulting in the chrominance signal Sc supplied to the additive mixer 82 not being appreciably noisier than if that signal had been recorded over the full width of the field tracks, as done by the conventional VHS VTR.

The local oscillator arrangements for the upconversions from color-under signals are similar to those used in prior-art VHS VTRs. Apparatus for regenerating the sampling clock signal SAMP during playback is not shown in FIG. 6. The apparatus typically includes an automatically-frequency-and-phase-controlled oscillator line-locked to synchronizing pulses separated from the response of the playback amplifier 64, from the response of the playback amplifier 66, from the combined responses of the playback amplifiers 64 and 66, or from the reproduced luminance signal SY. A frequency divider 77, which can comprise a triggered flip-flop, derives a half-rate sampling clock signal SAMP/2 from the sampling clock signal SAMP.

A sampler 76 samples the first sub-Nyquist sampled luminance signal Y($\phi$) from the first demodulator 68 according to the sampling clock signal SAMP. A sampler 78 samples the second sub-Nyquist sampled luminance signal Y($-\phi$) from the second demodulator 70 according to the complement of the sampling clock signal SAMP supplied from the inverter 75. A multiplexer 80 multiplexes the outputs from the samplers 76 and 78 according to the sampling clock signal SAMP/2 to reproduce at its output the full-band luminance signal Sy=[Y($\phi$)+Y($-\phi$)], as originally supplied for recording. The additive mixer 82 mixes the luminance signal Sy from the multiplexer 80 with the chrominance signal Sc from the scaling amplifier 74 (or its equivalent) to generate the composite video signal Vout.

Figure 7:
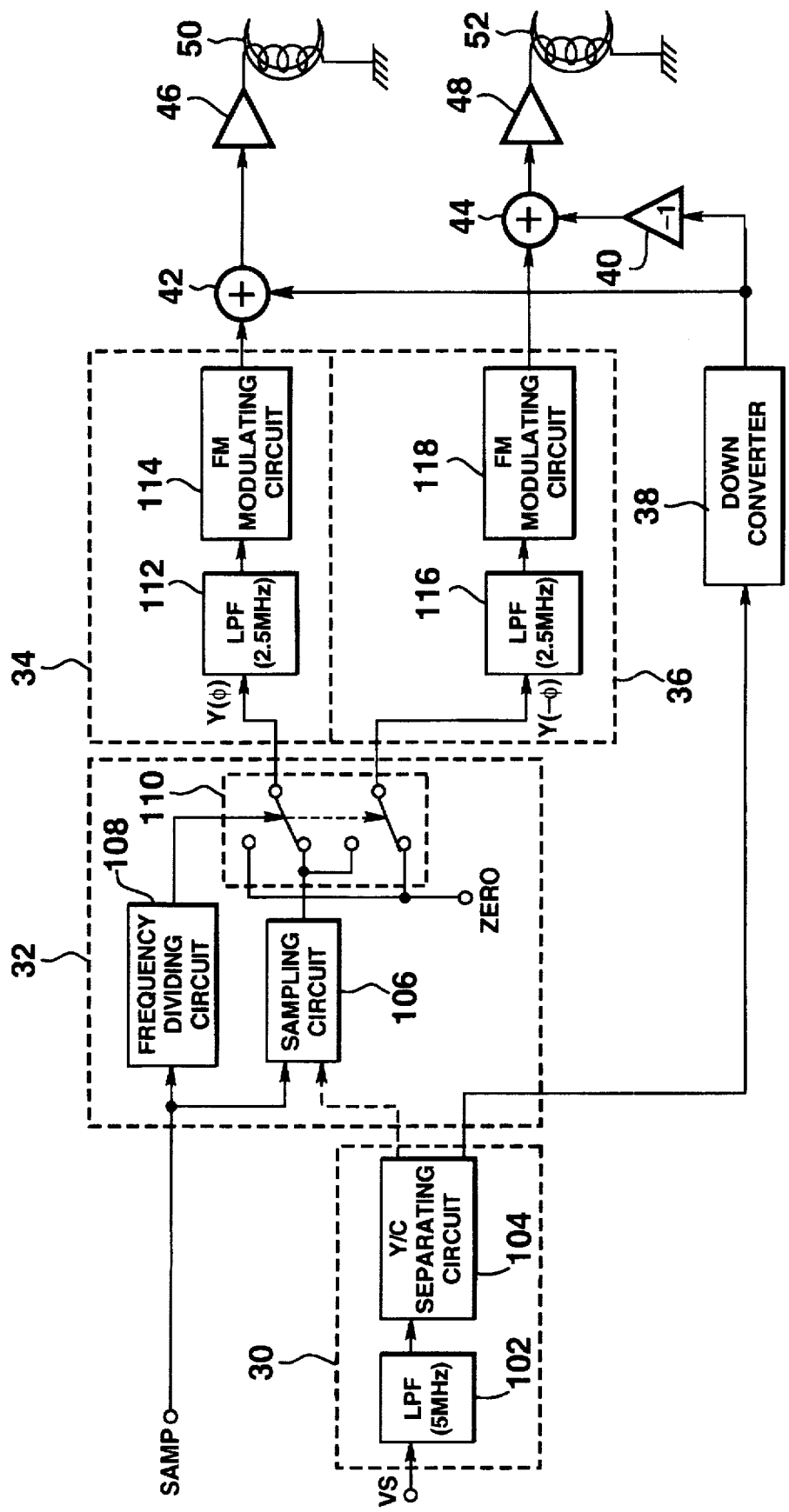
FIG. 7 is a more detailed block diagram of the FIG. 3 video tape recording circuitry.

FIG. 7 shows in greater detail one way to construct the FIG. 3 recording circuitry. FIG. 7 shows the Y/C separator 30 being of a type comprising a low pass filter 102 which constrains the composite video signal VS to a 5 MHz wide frequency band and a Y/C separating circuit 104. The sampler 32 is shown as being of a type comprising a sampling circuit 106 for sampling VS at 10 MHz rate, a frequency-dividing circuit 108, and a 4:2 multiplexing circuit 110. While the 4:2 multiplexing circuit 110 is depicted in FIG. 7 as an electrical switch of "double-pole-double-throw" type to illustrate graphically its function, the multiplexing circuit 110 is in fact a pair of electronic selection switches both controlled by the SAMP/2 square wave from the frequency dividing circuit 108 for selecting both the signal Y($\phi$) applied to the first modulator 34 and the signal Y($-\phi$) applied to the second modulator 36. A first electronic selection switch in the multiplexing circuit 110 chooses the successive samples forming the signal Y($\phi$) in a first 2:1 multiplexing operation, by alternately selecting a first set of successive alternate samples of VS, and by otherwise selecting zero-valued null samples. A second electronic selection switch in the multiplexing circuit 110 chooses the successive samples forming the signal Y($-\phi$) in a second 2:1 multiplexing operation, by alternately selecting a second set of successive alternate samples of VS, and by otherwise selecting zero-valued null samples. The first and second sets of successive alternate samples of VS are interleaved with each other in time. The first modulator 34 includes a low pass filter 112 with a 2.5 MHz cut-off frequency for responding to the signal Y($\phi$) and further includes an FM modulating circuit 114 for modulating the frequency of a first luminance carrier wave in accordance with the low pass response of the filter 112. The second modulator 36 includes a low pass filter 116 with a 2.5 MHz cut-off frequency for responding to the signal Y($-\phi$) and further includes an FM modulating circuit 118 for modulating the frequency of a first luminance carrier wave in accordance with the low pass response of the filter 116. Other components of FIG. 7 are the same as in FIG. 3. When the sampling clock signal SAMP is 637 times horizontal scan line frequency, the frequency dividing circuit 108 divides in half the approximately 10 MHz sampling clock signal SAMP that results to generate a SAMP/2 sampling clock signal at approximately 5 MHz. The electronic switch 110 generates Y($\phi$) and Y($-\phi$) signals, which are passed through the low pass filters 112 and 116 to suppress sidebands of the sampling carriers to provide continuous Y($\phi$) and Y($-\phi$) signals for modulating the frequencies of respective luma carriers in the FM modulating circuits 114 and 118. The resulting FM signals are supplied for recording on respective subtracks in the same way described for FIG. 3.

In practice portions of the FIG. 7 circuitry are better done using digital circuitry. The low pass filters 112 and 116 are best realized as finite-impulse-response digital filters, since they will be linear-phase even through the cut-off region. Since the FM modulators 114 and 118 are usually constructed to respond to analog modulating signals, the low pass filters 112 and 116 are followed by respective digital-to-analog converters (not explicitly shown in FIG. 7). The sampling circuit 106 can be provided by an analog-to-digital converter, with the low pass filter 102 with 5 MHz cut-off frequency serving as the customary analog pre-filter for the analog-to-digital converter to prevent aliasing in the conversion procedure arising from undersampling. The multiplexing circuit 110 typically is constructed from tri-state logic elements.

In a variant of this scheme, the Y/C separator 104 can be constructed as a digital filter, with the analog-to-digital converter being located directly after the low pass filter 102. There is then no need for another sampling circuit 106 and the digital separated luminance signal from the Y/C separator 104 can be supplied directly to the multiplexing circuit 110. The digital separated chrominance signal from the Y/C separator 104 is supplied to a digital-to-analog converter for generating an analog signal for application to the downconverter 38.

Figure 8:
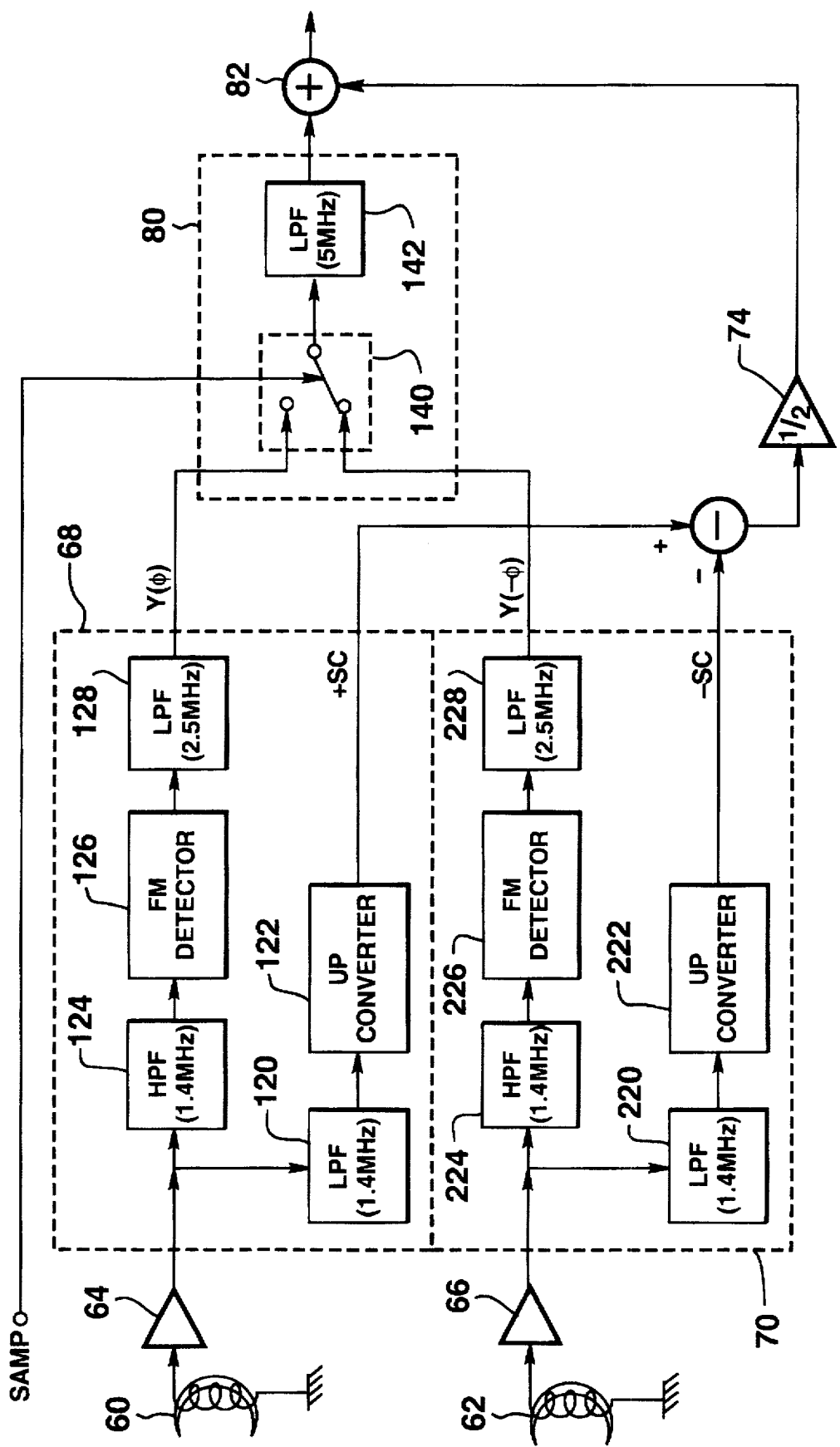
FIG. 8 is a more detailed block diagram of the FIG. 6 video tape playback circuitry.

FIG. 8 shows in greater detail one way to construct the FIG. 6 playback circuitry. The first demodulator 68 receives a reproduced first frequency-multiplexed signal from the playback amplifier 64 in response to the reproduced first subtrack signal recovered by the head 60. FIG. 8 shows the first demodulator 68 including a low pass filter 120 for separating a reproduced first color-under signal from the reproduced first frequency-multiplexed signal, an upconverter 122 for generating a reproduced first chrominance signal Sc from the reproduced first color-under signal, a high pass filter 124 for separating a first frequency-modulated luminance carrier from the reproduced first frequency-multiplexed signal, an FM detector 126 for detecting the continuous $Y(\phi)$ signal used to modulate the first frequency-modulated luminance carrier, and a low pass filter 128 with 2.5 MHz cut-off frequency. FIG. 8 shows the second demodulator 70 including a low pass filter 130 for separating a reproduced first color-under signal from the reproduced first frequency-multiplexed signal, an upconverter 132 for generating a reproduce first chrominance signal −Sc from the reproduced first color-under signal, a high pass filter 134 for separating a first frequency-modulated luminance carrier from the reproduced first frequency-multiplexed signal, an FM detector 136 for detecting the continuous $Y(-\phi)$ signal used to modulate the first frequency-modulated luminance carrier, and a low pass filter 138 with 2.5 MHz cut-off frequency. In FIG. 8 the multiplexer 80 uses a 2:1 multiplexing circuit 140 and a low pass filter 142 with a 5 MHz cut-off frequency. At a switching or sampling rate of 10 MHz, the multiplexing circuit 140 alternately selects to the input of the low pass filter 142 the signals $Y(\phi)$ and $Y(-\phi)$ from the low pass filters 128 and 138. The low pass filters 128 and 138 suppress any above-band components that might accompany the $Y(\phi)$ and $Y(-\phi)$ signals and be downconverted to be in-band by the switching of the multiplexing circuit 140. The low pass filter 142 smoothes the reproduced full-band luminance signal supplied to the additive mixer 82, where it is combined with the chrominance signal Sc from the scaling amplifier 74 (or its equivalent) thereby to generate the composite video signal Vout.

Portions of the FIG. 8 circuitry may be realized using digital circuitry. The FM detectors 126 and 136 may be followed by analog-to-digital converters the pre-filters of which include the low pass filters 128 and 138 or portions thereof. The multiplexing circuit 140 can be constructed from tri-state logic elements and followed by a digital-to-analog converter, with the low pass filter 142 or a portion thereof following that converter for smoothing its output.

Figure 9:
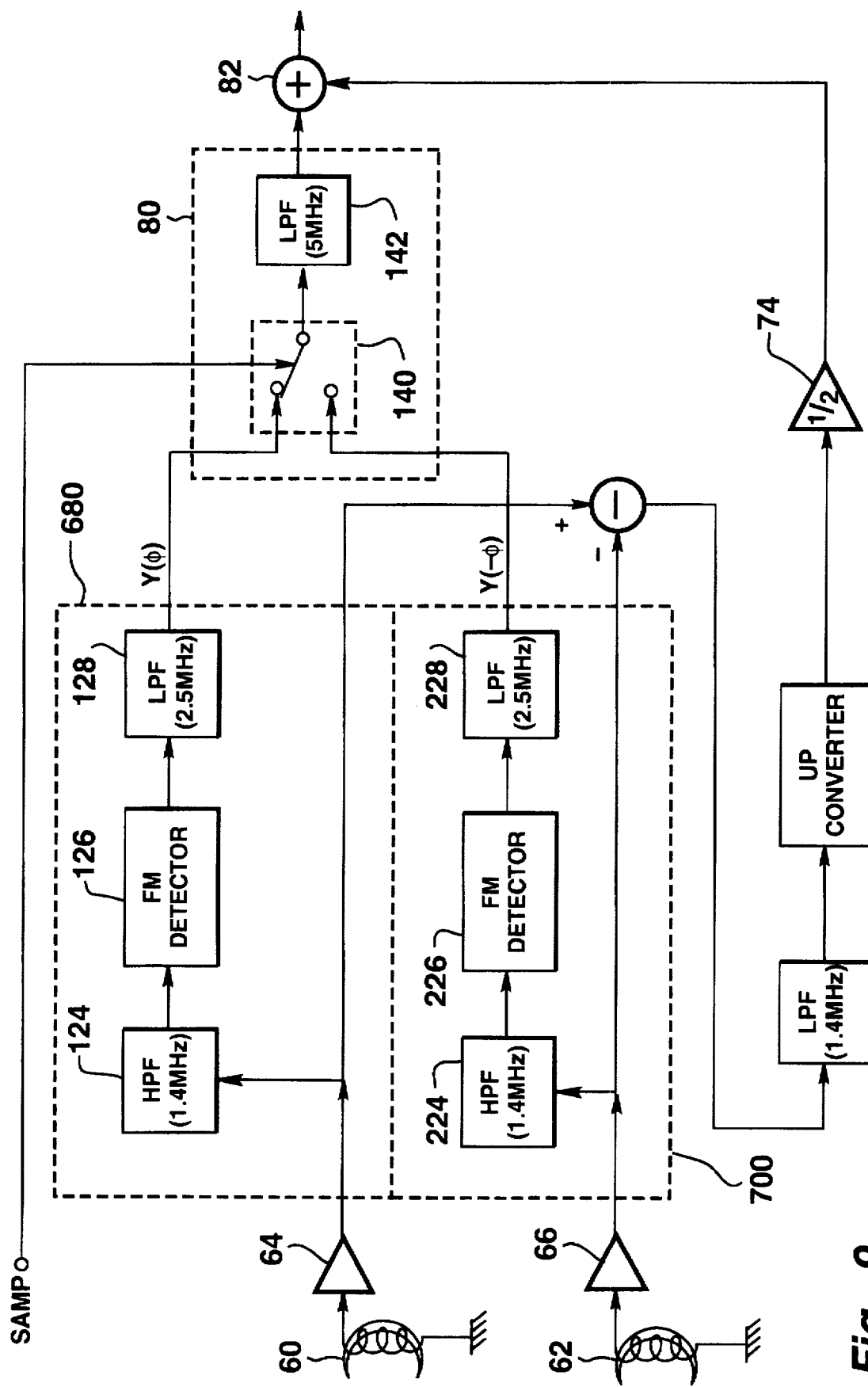
FIG. 9 is a block diagram of a modification of the FIG. 8 video signal recovering system.

FIG. 9 shows circuitry for reproducing the chrominance signal Sc, which can replace that shown in FIG. 8. Elements 72, 74, 120, 122, 130 and 132 are dispensed with. An additive mixer 144 supplies a differential response to a low pass filter 148, which passes to an upconverter 146 only the differential response 2C to the C and −C respective first and second color-under signal components of the reproduced first and second frequency-multiplexed signals respectively supplied from the playback amplifiers 64 and 66. Responsive to the double-amplitude color-under signal 2C, the upconverter 148 generates the doubl-eamplitude chrominance signal 2SC for application to the scaling amplifier 74. The high pass filter 124, the FM detector 126, and the low pass filter 128 are retained, in the modified first demodulator 680. The high pass filter 224, the FM detector 226, and the low pass filter 228 are retained, in the modified first demodulator 700. The FIG. 9 modification uses only one low pass filter 146 for separating color-under signal from FM luma signal in place of the two low pass filters 120 and 130, and the modification uses only one upconverter 148 in place of the two upconverters 122 and 132. Furthermore, the low pass filtering and upconversion of the reproduced first and second color-under signals in combined form reduces the likelihood of differential phase error between them or chrominance components generated from them. Such differential phase error is a particular problem should it vary with chroma strength, since color errors occur that cannot be cured by simple tint controlling circuitry.

When the sampling clock SAMP is chosen to be an odd multiple of half scan line rate, there is an odd number of pixels per scan line as well as an odd number of scan lines per frame, so the sampling patterns for the first and second sub-Nyquist sampled luminance signals $Y(\phi)$ and $Y(-\phi)$ in each frame automatically alternate spatial phasing from frame to frame. This provides for temporal averaging of $Y(\phi)$ and $Y(-\phi)$ during the static portions of television images recovered by normal-VHS-standard VCRs. When the sampling clock SAMP is chosen to be an even multiple of half scan line rate, there is an odd number of pixels per scan line and an odd number of scan lines per frame, so provisions need to be made in order to alternate from frame to frame the spatial phasing of the sampling patterns for the first and second sub-Nyquist sampled luminance signals $Y(\phi)$ and $Y(-\phi)$. Frame-by-frame switching of the subtracks on which the first and second sub-Nyquist sampled luminance signals $Y(\phi)$ and $Y(-\phi)$ are recorded and from which they are played back will provide for temporal averaging of $Y(\phi)$ and $Y(-\phi)$ during the static portions of television images recovered by normal-VHS-standard VCRs. This provides, at the cost of more complex time-division multiplexing switches, somewhat better playback compatibility than continuously recovering just the first sub-Nyquist sampled luminance signal $Y(\phi)$ or the second sub-Nyquist sampled luminance signal $Y(-\phi)$.

Figure 10:
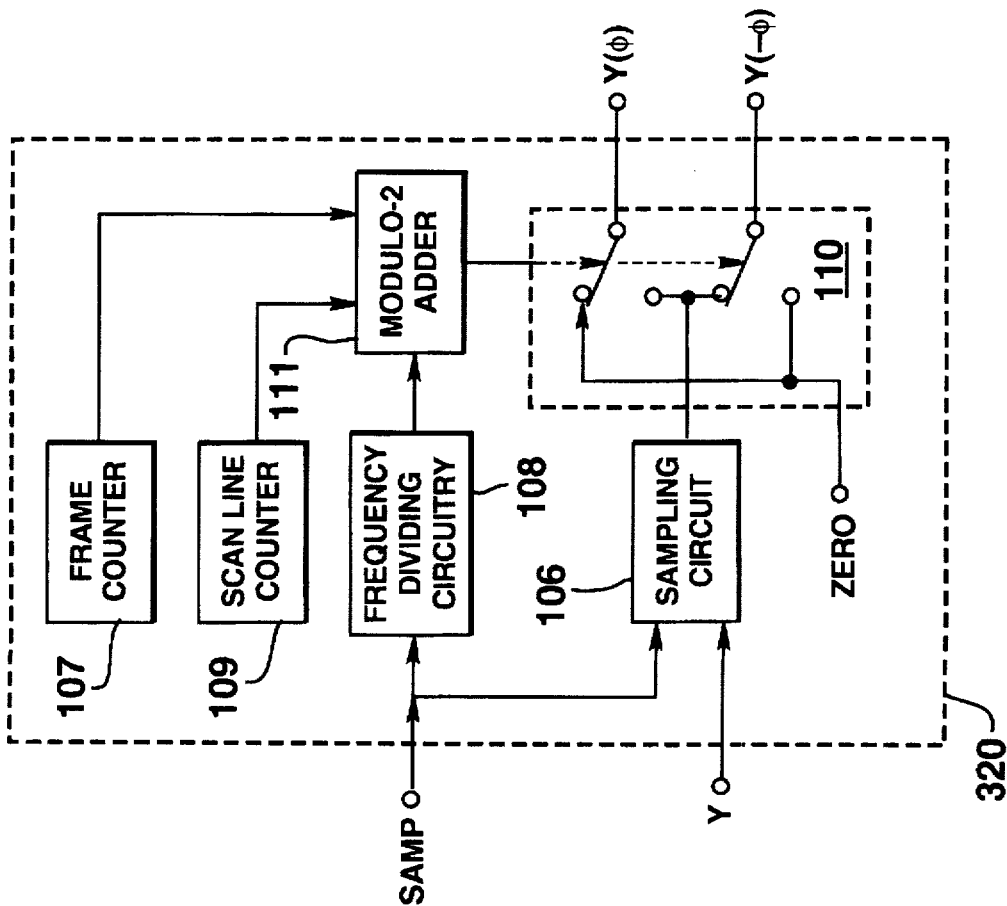
FIG. 10 is a block diagram of a modification of the FIG. 8 video tape recording circuitry.

FIG. 10 shows the modified sampler 320 that replaces the sampler 32 when the FIG. 7 video tape recording circuitry is modified to implement frame-by-frame switching of the subtracks on which the first and second sub-Nyquist sampled luminance signals $Y(\phi)$ and $Y(-\phi)$ are recorded. A frame counter 107 counts frames modulo-two responsive to vertical synchronizing pulses separated by means not shown from the composite video signal offered for recording; and a scan line counter 109 counts horizontal scan lines modulo-two for each frame responsive to horizontal synchronizing pulses separated by means not shown from that composite video signal, with the reset for the scan line counter 109 being supplied from the counter 107. A three-input modulo-two adder 111 responds to the modulo-two frame count from the counter 107, the modulo-two scan line count from the counter 109 and to the SAMP/2 signal from the frequency-dividing circuitry 108, to control the switching of the 4:2 multiplexing circuit 110.

Figure 11:
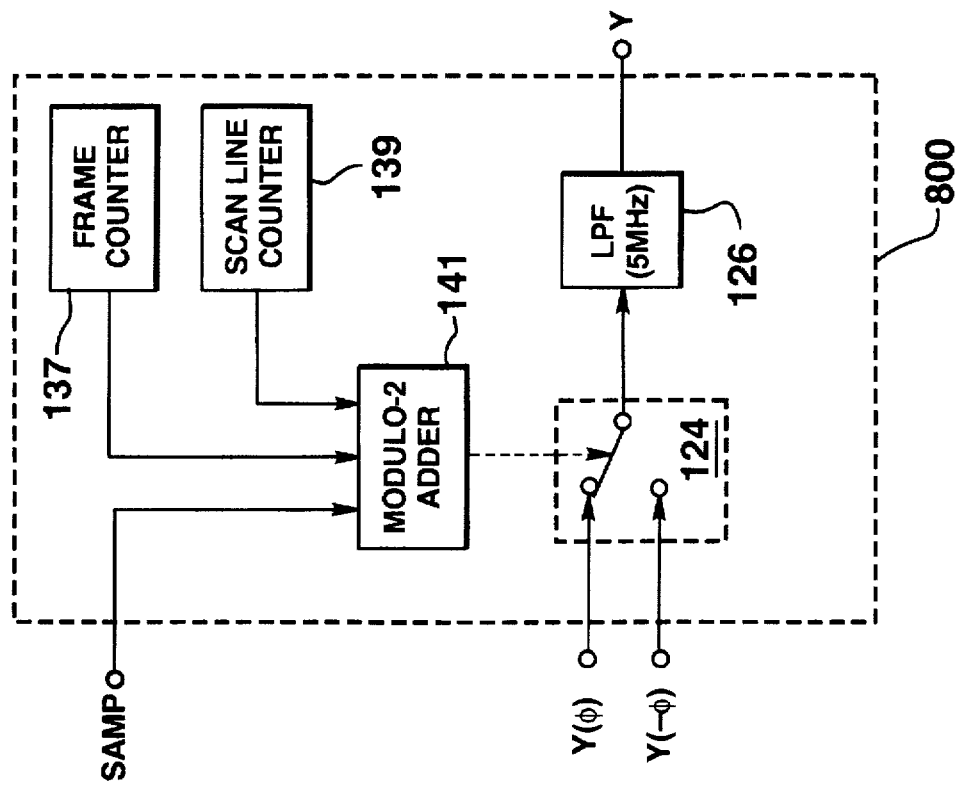
FIG. 11 is a block diagram of a modification of the FIG. 8 video tape playback circuitry.

FIG. 11 shows the modified multiplexer 800 that replaces the multiplexer 80 when the FIG. 8 video tape playback circuitry is modified to accommodate the frame-by-frame switching of the subtracks on which the first and second sub-Nyquist sampled luminance signals Y(φ) and Y(−φ) are recorded. A frame counter 137 counts frames modulo-two responsive to vertical synchronizing pulses separated by means not shown from the composite video signal recovered during playback, or from one of the first and second sub-Nyquist sampled luminance signals Y(φ) and Y(−φ) recovered during playback; and a horizontal scan line counter 139 counts the horizontal scan lines modulo-two for each frame responsive to horizontal synchronizing pulses separated by means not shown from one of the signals recovered during playback, with the reset for the scan line counter 139 being supplied from the counter 137. A three-input modulo-two adder 141 responds to the modulo-two frame count from the counter 137, the modulo-two scan line count from the counter 139 and to the SAMP signal to control the switching of the 2:1 multiplexing circuit 140.

Figure 12:
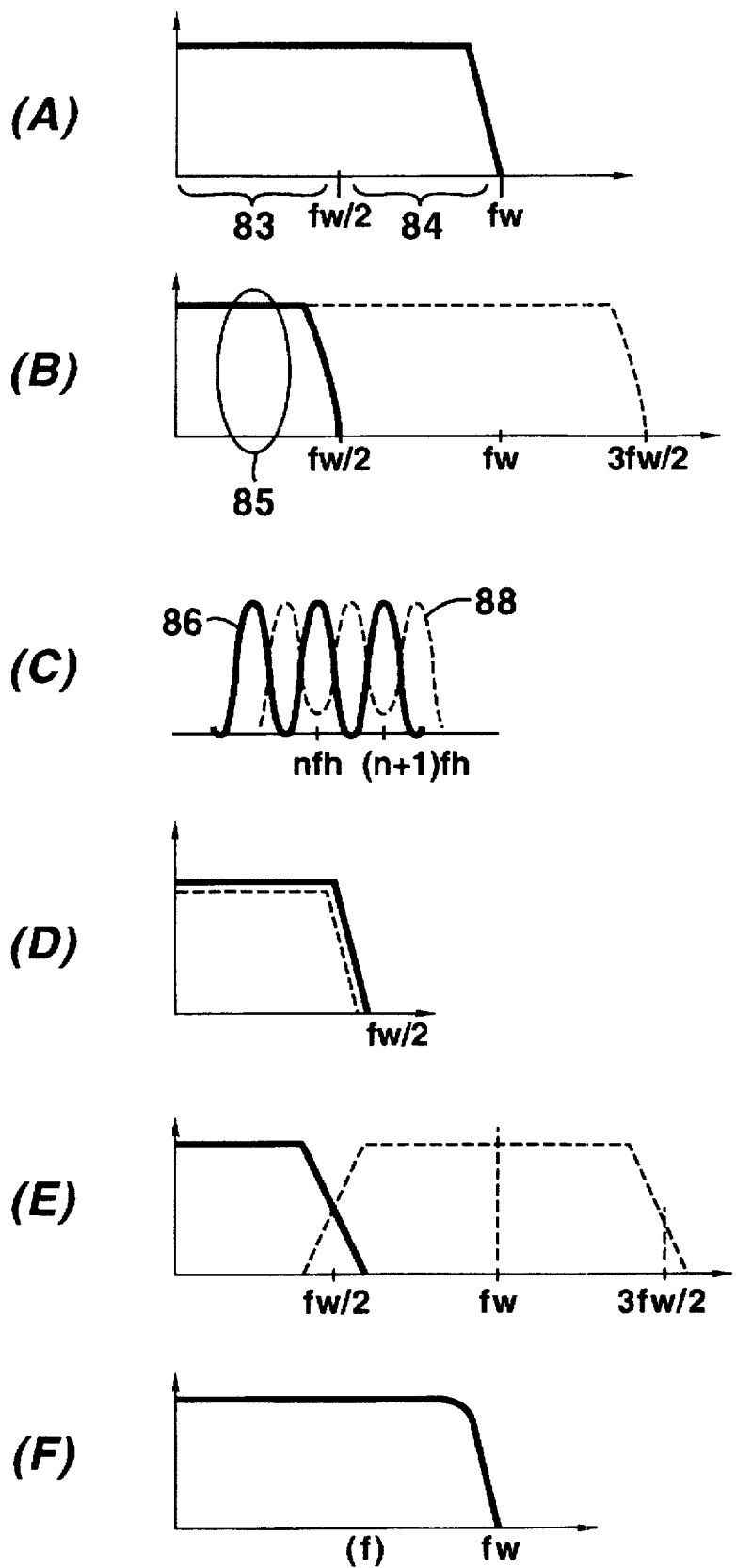
FIGS. 12A–12F show frequency spectra of signals in the FIG. 3 recording circuitry and FIG. 6 playback circuitry.

FIG. 12A shows the amplitude of baseband frequency spectrum of the full-bandwidth luminance signal Sy offered for recording to the FIG. 3 or 7 recording circuitry, which spectrum extends from zero frequency (DC) up to a cut-off frequency that is somewhat lower than a frequency fw where there is no appreciable energy. The Nyquist rate fN, for sampling this spectrum without aliases extending into this baseband spectrum, is twice fw. The sampling circuit 32 sub-Nyquist samples this luminance signal by alternately sampling, at the Nyquist rate of twice fw, zero and the full-bandwidth luminance signal Sy of FIG. 12A or (as in the FIG. 7 recording circuitry) that signal Sy as previously sampled at Nyquist rate. Such sub-Nyquist sampling is done in each of the two possible phases to generate the first and second sub-Nyquist sampled luminance signals Y(φ) and Y(−φ), respectively, in unfiltered form. In both the signals Y(φ) and Y(−φ) the sub-Nyquist sampling procedure folds into a low-frequency band 83 components of the fw spectrum previously in a high-frequency band 84, according to a sampling theorem. The components of the fw spectrum folded into the low-frequency band 83 by sub-Nyquist sampling appear in reversed order in frequency as a reverse-frequency subspectrum superposed on a normal-frequency subspectrum already residing in the low-frequency band 83.

FIG. 12B shows the amplitude of the frequency spectrum of a sub-Nyquist sampled luminance signal as results from the FIG. 3 sampler 32 alternately sampling, at the Nyquist rate, zero and the full-bandwidth luminance signal Sy of FIG. 12A. The overlapping higher-frequency spectra, which do not reach down below fw/2 are omitted for clarity. The amplitude of the Y(φ) frequency spectrum and the amplitude of the Y(−φ) frequency spectrum both resemble the FIG. 12B spectrum. The differences in the two spectra is with regard to the phasing of the frequencies contained in their respective spectra, their phase spectra being orthogonal to each other.

FIG. 12C shows a detailed enlarged diagram of a domain 85 in the FIG. 12B frequency spectrum of the sub-Nyquist sampled luminance signal, supposing the Nyquist rate is an odd multiple of half horizontal scan line rate, the solid-line expanded-frequency-scale spectrum 86 indicating how the domain 85 appears in the non-reversed-spectrum or non-folded portion of the sub-Nyquist sampled signal and the dashed-line expanded-frequency-scale spectrum 88 indicating how the domain 85 appears in the reversed-spectrum or folded portion of the sub-Nyquist sampled signal. In the non-reversed-spectrum 86 that is the non-folded portion of the Y(φ) or Y(−φ) signal, energy tends to be concentrated in the frequency regions surrounding even harmonics of half line scan rate for static portions of the television image. In the reversed-spectrum 88 that is the folded portion of the Y(φ) or Y(−φ) signal, energy tends to be concentrated in the frequency regions surrounding odd harmonics of half line scan rate for static portions of the television image.

FIG. 12D shows the portion of the FIG. 12B frequency spectrum passed by a linear-phase low pass filter with a 3 dB cut-off frequency of fw/2. The FIG. 3 includes two such low pass filters, one for each of the signals Y(φ) and Y(−φ) resulting from sub-Nyquist sampling. These low pass filters for the signals Y(φ) and Y(−φ) might be considered as being included in the sampler 32, but in this specification are considered as being included as modulating signal pre-filters in respective ones of the FM modulators 34 and 36. The low pass filter response includes both the normal-frequency subspectrum and a reversed-frequency subspectrum the phasing of which depend on whether the low pass filter response is to the signal Y(φ) or to the signal Y(−φ), the two low pass filter responses are recorded as parts of the first and second subtrack signals, respectively, and are reproduced during playback by the first demodulator 68 and the second demodulator 70 in the FIG. 6 or 9 playback circuitry.

FIG. 12E shows the frequency spectrum generated when alternately selecting at the rate fw (i. e., one-half Nyquist rate) between zero and a low pass filter response having a frequency spectrum per FIG. 12D, which is a sub-Nyquist resampling procedure. Two such low pass filter responses are reproduced during playback; one, the Y(φ) signal; and the other, the Y(−φ) signal. The two spectra per FIG. 12E formed by sub-Nyquist resampling the Y(φ) signal and the Y(−φ) signal differ in regard to the distribution of energy around harmonics of half scan line rate. When summed, these spectra add to a spectrum similar to that shown in FIG. 12E and with energy around both odd and even harmonics of half scan line rate. This combined spectrum corresponds to that of the output signal from the 2:1 multiplexing circuit 140 in the FIG. 8 video signal recovering system.

FIG. 12F shows the frequency spectrum of the response of the low pass filter 142 to the output signal from the 2:1 multiplexing circuit 140 in the FIG. 8 video signal recovering system. The filter 142 response cuts off just about at frequency fw.

Figure 13:
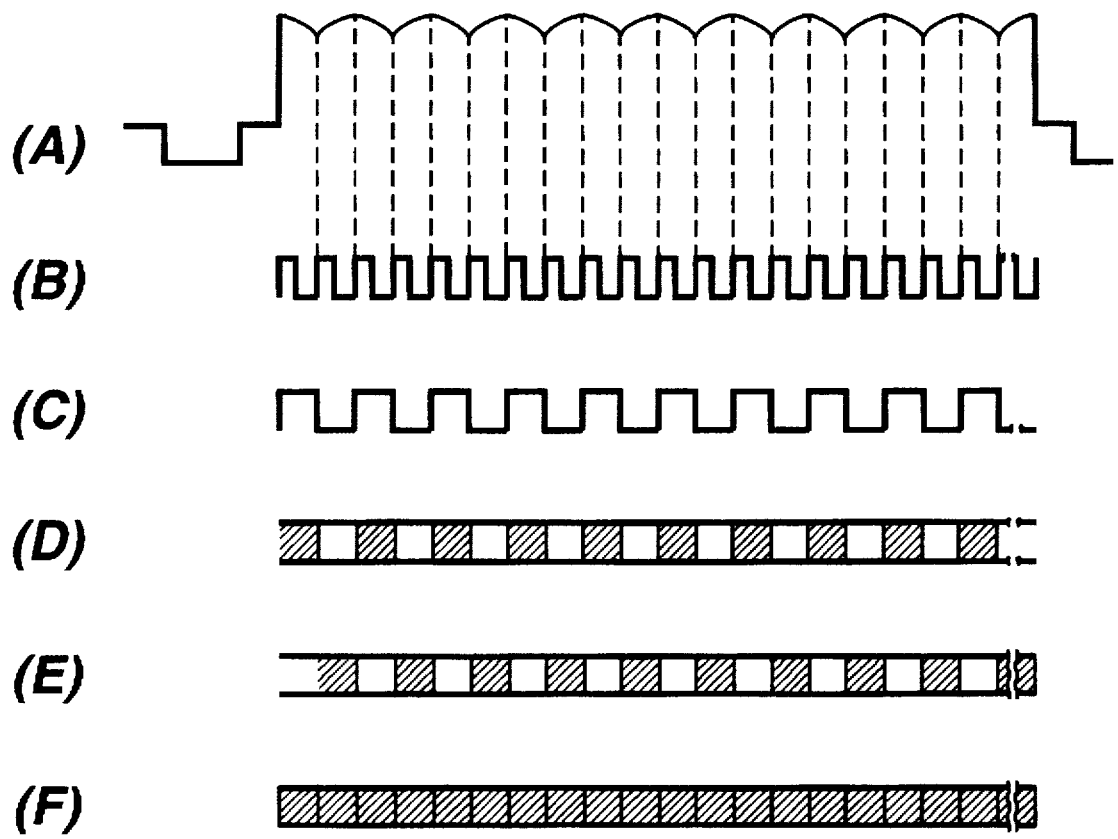
FIGS. 13A–13F are waveform plots against a common time abscissa, graphically illustrating sub-Nyquist sampling along a single scanning line, and being useful to explain the operation of FIG. 3 recording circuitry and FIG. 6 playback circuitry.

FIGS. 13A–13E are waveform plots against a common time abscissa, graphically illustrating sub-Nyquist sampling along a single scanning line, and being useful in more fully understanding the operation of the FIG. 7 recording circuit and FIG. 8 playback circuit. FIG. 13A shows a horizontal component of a video corresponding to a horizontal line scan signal. FIG. 13B shows the Nyquist sampling clock SAMP used in the FIG. 8 recording circuitry to time the sampling of the Sy full-bandwidth luminance signal by the sampling circuit 106. FIGS. 13C and 13D show the formation of interleaved-in-time sub-Nyquist sampling signals Y(φ) and Y(−φ) by alternately sampling the FIG. 13A horizontal scan line of Sy full-bandwidth luminance signal, and FIG. 13E shows a state when the waveform of FIG. 13C and the waveform of FIG. 13D are recovered and combined with each other by the 2:1 multiplexing circuit 140 in the FIG. 8 multiplexer 80.

Therefore, according to the above, the luminance signal Sy of a video signal which has the same frequency spectrum as in the waveform of FIG. 12A, is sampled at or just above Nyquist rate and then sub-sampled, alternately selecting pixels for inclusion in a first sub-Nyquist sampled luminance signal Y(φ) and for inclusion in a second sub-Nyquist sampled luminance signal Y(−φ), which Y(φ) and Y(−φ)

signals respectively comprise first and second sets of Sy samples that are interleaved with each other in spatial phasing both in the vertical direction and in the horizontal direction. These Y($\phi$) and Y($-\phi$) signals are respectively recorded on two separate tracks obtained by splitting a conventional recording track. Since these first and second sub-Nyquist sampled luminance signals Y($\phi$) and Y($-\phi$) together comprise a complete set of samples of the same image field, there is no error owing to motion when the samples of the image field are 100% temporally correlated— that is, are snapshots in time, as is the case when the composite video signal is from a motion picture or from a solid-state video camera. Also, since these first and second sub-Nyquist sampled luminance signals Y($\phi$) and Y($-\phi$) together comprise a complete set of samples of each image field, it is possible to recover the full bandwidth of the original luminance signal recorded in accordance with the invention. Furthermore, the luminance resampling procedures operate to sample the luminance signal recovered from a video recording made by a conventional VTR to recover its full bandwidth, as recorded.

As noted above, for best playback compatibility with normal-VHS-standard VCRs, it is preferable to record the first subtrack with recording heads the gaps of which are alternately +6° and −6° azimuth angles α1 and α2 from field to field, and to record the second subtrack with recording heads the gaps of which in preferred embodiments of the invention are at azimuth angle(s) other than either of the azimuth angles α1 and α2. In one such embodiment of the invention the first subtrack is recorded with heads the gaps of which alternate from field to field at the +6° and −6° azimuth angles α1 and α2, and in which the second subtrack is recorded with heads of which also alternate from field to field at the same azimuth angles α1 and α2 but in staggered phasing with the first subtrack phasing. In a normal-VHS-standard VCR, the servomechanism used to control the position of the headwheel so it tracks the field tracks may tend to track portions of both of two adjacent subtracks having the same azimuth angle but being a field apart in time. This undesirable tendency can be reduced by using anti-phase unmodulated luma carriers in the first and second subtrack signals, so the FM signal recovery by the heads when they overlap first and second subtracks that have different azimuth angles tends on average to be larger than when they overlap first and second subtracks that have the same azimuth angle. The magnitude of the FM signal recovery by the heads is used to control the headwheel positioning in most headwheel positioning servos. There will, however, still be some field-to-field crosstalk. This is why it is preferable to record the first subtrack with recording heads the gaps of which are alternately +6° and −6° azimuth angles α1 and α2 from field to field, and to record the second subtrack with recording heads the gaps of which in preferred embodiments of the invention are at azimuth angle(s) other than either of the azimuth angles α1 and α2.

The reversal of color-under signal polarity from subtrack to subtrack in adjacent field tracks of video tapes recorded in accordance with the invention can be exploited to provide additional control information to the servomechanism used to control the position of the headwheel. The Sc and −Sc signals recovered by the first and second demodulators 68 and 70 of the FIG. 6 playback circuitry can be summed to generate a signal that is zero-valued when the headwheel is correctly positioned respective to field tracks on the video tape. Synchronously detecting this signal in accordance with the 3.58 MHz local color oscillator will generate an error signal for the zero that is one polarity for the headwheel position being too far to one side and that is the opposite polarity for the headwheel position being too far to the other side.

Referring to the recording circuitry shown in either FIG. 3 or FIG. 7, the polarity of the FM signal supplied by the first FM modulator 34 and the polarity of the FM signal supplied by the second FM modulator 36 have no effect on the polarity of the signals detected by the FM detectors 126 and 136 in the FIG. 9 playback circuitry. Consequently, the frequency-multiplexing of the sub-Nyquist sampled luminance signals with the in-phase and anti-phase color-under signals can be carried out using subtractors rather than adders in the additive mixers 42 and 44, using the sub-Nyquist sampled luminance signals as subtrahend input signals to those subtractors.

One skilled in the art will be enabled by acquaintance with the foregoing disclosure to design a number of variants of the described embodiments; and this should be borne in mind when construing the claims following this specification, so as to include obvious variants within the scope of those claims. By way of example, the benefits of the invention are realized at least to some degree when the double sampling of the luminance signal prior to sub-Nyquist sample selection is done anywhere in the range from Nyquist rate to twice Nyquist rate.

What is claimed is:

1. A video tape recorder system, which records magnetic responses to a composite video signal in a recording medium on field tracks with a field track width, and which picks up and recovers from said recording medium electric responses to said composite video signal recorded on said field track, said composite video signal being descriptive of line by line scanning of a television image field at a line scan rate, the successive scanning lines of each television image frame being identified by consecutive ordinal numbers, and successive television image frames being identified by consecutive ordinal numbers, said video tape recorder system comprising:

luma/chroma separating means for separating said composite video signal into a luminance signal and a chrominance signal;

chrominance signal converting means for generating by downconversion from said chrominance signal, a first color-under signal and a second color-under signal in phasing opposite to that of said first color-under signal;

sampling means for sampling said luminance signal according to a first sampling clock signal supplied at a rate at least the Nyquist rate for said luminance signal, but not as much as twice the Nyquist rate, to obtain an integral number of samples per scanning line which samples are identified by consecutive ordinal numbers beginning with first, and ones of said samples identified by the same ordinal number being arranged within said television image frames in a line transverse to the nominal direction of said scanning lines;

means included within said sampling means, separating odd-numbered samples from odd-numbered scan lines and even-numbered samples from even-numbered scan lines as those samples sequentially occur during scanning of each odd-numbered television image frame and each even-numbered television image frame, respectively, and further separating even-numbered samples from odd-numbered scan lines and odd-numbered samples from even-numbered scan lines as those samples sequentially occur during scanning of each even-numbered television image frame and each odd-numbered television image frame, respectively, for generating a first sub-Nyquist sampled luminance signal and a second sub-Nyquist sampled luminance signal, respectively;

first modulating means for generating a first modulated signal having frequencies above those of said first color-under signal, said first modulated signal being modulated in accordance with said first sub-Nyquist sampled luminance signal;

means for generating a first subtrack video signal by frequency-multiplexing said first modulated signal from said first modulating means together with said first color-under signal from said chrominance signal converting means;

second modulating means for generating a second modulated signal having frequencies above those of said second color-under signal, said second modulated signal being modulated in accordance with said second sub-Nyquist sampled luminance signal;

means for generating a second subtrack video signal by frequency-multiplexing said second modulated signal from said second modulating means together with said second color-under signal from said chrominance signal converting means;

recording and playback means including a headwheel, a first even-numbered plurality of heads mounted along the rim of said headwheel for recording magnetic responses to said first subtrack video signal in first subtracks occupying a first half of the width of said field tracks in said recording medium and playing back a first reproduced subtrack video signal responsive to magnetic responses previously recorded in said first subtracks in said recording medium, and a second even-numbered plurality of heads mounted along the rim of said headwheel for recording magnetic responses to said second subtrack video signal in second subtracks occupying a second half of the width of said field tracks in said recording medium and playing back a second reproduced subtrack video signal responsive to magnetic responses previously recorded in said second subtracks in said recording medium;

first demodulating means responding to said first reproduced subtrack video signal for reproducing said first sub-Nyquist sampled luminance signal as a first reproduced sub-Nyquist sampled luminance signal and for reproducing said chrominance signal in a first phasing as a first reproduced chrominance signal, said first demodulating means being of a type separating a first reproduced color-under signal from said first subtrack video signal, generating said first reproduced chrominance signal from said first reproduced color-under signal by upconversion thereof, separating a first reproduced modulated signal from said first subtrack video signal, and detecting from said first reproduced modulated signal said first reproduced sub-Nyquist sampled luminance signal;

second demodulating means responding to said second reproduced subtrack video signal for reproducing said second sub-Nyquist sampled luminance signal as a second reproduced sub-Nyquist sampled luminance signal and for reproducing said chrominance signal in a second phasing as a second reproduced chrominance signal, said second demodulating means being of a type separating a second reproduced color-under signal from said second subtrack video signal, generating said second reproduced chrominance signal from said second reproduced color-under signal by upconversion thereof, separating a second reproduced modulated signal from said second subtrack video signal, and detecting from said second reproduced modulated signal said second reproduced sub-Nyquist sampled luminance signal;

multiplexing means for reproducing said luminance signal by alternately sampling said first reproduced sub-Nyquist sampled luminance signal and said second reproduced sub-Nyquist sampled luminance signal according to a second sampling clock signal, thereby generating a reproduced luminance signal;

means for generating a combined response to said first reproduced chrominance signal and said second reproduced chrominance signal, in which said combined response respective component responses to said first reproduced chrominance signal and to said second reproduced chrominance signal combine constructively; and means for reproducing said composite video signal, by combining said combined response to said first reproduced chrominance signal and said second reproduced chrominance signal with said reproduced luminance signal from said multiplexing means.

2. A video tape recorder system as set forth in claim 1, wherein said first plurality of heads are mounted on said headwheel such that their gaps alternate from one field track scan to the next field track at a first azimuth angle and at a second azimuth angle, wherein said second plurality of heads are mounted on said headwheel such that their gaps alternate from one field track scan to the next field track at a third azimuth angle and at a fourth azimuth angle, and wherein said first and second azimuth angles are opposite to each other as measured respective to a perpendicular to the direction of said field tracks.

3. A video tape recorder system as set forth in claim 2, wherein said third and said fourth azimuth angles, as measured respective to a perpendicular to the direction of said field tracks, each differ from both said first and said second azimuth angles as so measured.

4. A video tape recorder system as claimed in claim 3, wherein said third and said fourth azimuth angles are opposite to each other as measured respective to a perpendicular to the direction of said field tracks.

5. A video tape recorder system as claimed in claim 2, wherein said first and second azimuth angles are opposite to each other as measured respective to a perpendicular to the direction of said field tracks, wherein said third and said fourth azimuth angles are opposite to each other as measured respective to a perpendicular to the direction of said field tracks, wherein the polarities of said first and second azimuth angles alternate from field to field in a first phasing, and wherein the polarities of said third and fourth azimuth angles alternate from field to field in a second phasing staggered with respect to said first phasing.

6. A video tape recorder system as claimed in claim 5, wherein said second and third azimuth angles are of the same polarity as each other, but of different values.

7. A combinations comprising:

means for providing a video signal, said video signal being descriptive of line by line scanning of a television image field at a line scan rate, the successive scanning lines of each television image field being identified by consecutive ordinal numbers, and successive television image frames being identified by consecutive ordinal numbers;

sampling means for sampling a luminance signal component of the video signal according to a first sampling clock signal supplied at a rate at least the Nyquist rate for the luminance signal component of said video signal, but not as much as twice the Nyquist rate, to obtain an integral number of samples per scanning line which samples are identified by consecutive ordinal numbers beginning with first, and ones of said samples identified by the same ordinal number being arranged within said television image frames in a line transverse to the nominal direction of said scanning lines;

means included within said sampling means, separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

means included within said sampling means, separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal; and means for simultaneously transmitting said first and second sub-Nyquist sampled luminance signals via a transmission medium.

8. A video tape recorder system which records magnetic responses to a video signal in a recording medium, on field tracks with a field track width, said video signal being descriptive of line by line scanning of a television image field at a line scan rate, the successive scanning lines of each television image field being identified by consecutive ordinal numbers, and successive television image frames being identified by consecutive ordinal numbers, said video tape recorder system comprising:

sampling means for sampling a luminance signal component of the video signal according to a first sampling clock signal supplied at a rate at least the Nyquist rate for said luminance signal component, but not as much as twice the Nyquist rate, to obtain an integral number of samples per scanning line which samples are identified by consecutive ordinal numbers beginning with first, and ones of said samples identified by the same ordinal number being arranged within said television image fields in a line transverse to the nominal direction of said scanning lines;

means included within said sampling means, separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

means included within said sampling means, separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal; and recording means including a headwheel, for simultaneously recording the first sub-Nyquist sampled luminance signal on a first subtrack of each field track using a first even-numbered plurality of heads and recording the second sub-Nyquist sampled luminance signal on a second subtrack of each field track using a second even-numbered plurality of heads, said first and second subtracks each having a respective width one-half the width of the field track, said first plurality of heads being mounted with regular spacing around the rim of said headwheel with their gaps alternately set to a first azimuth angle and to a second azimuth angle, and said second plurality of heads being mounted with regular spacing around the rim of said headwheel with their gaps alternately set to a third azimuth angle and to a fourth azimuth angle.

9. A video tape recorder system as claimed in claim 8, wherein said first and second azimuth angles are opposite to each other as measured respective to a perpendicular to the direction of said field tracks, and wherein said third and said fourth azimuth angles each differ from both said first and said second azimuth angles.

10. A video tape recorder system as claimed in claim 9, wherein said third and said fourth azimuth angles are opposite to each other as measured respective to a perpendicular to the direction of said field tracks.

11. A video tape recorder system as claimed in claim 8, wherein said first and second azimuth angles are opposite to each other as measured respective to a perpendicular to the direction of said field tracks, wherein said third and said fourth azimuth angles are opposite to each other as measured respective to a perpendicular to the direction of said field tracks, wherein the polarities of said first and second azimuth angles alternate from field to field in a first phasing, and wherein the polarities of said third and fourth azimuth angles alternate from field to field in a second phasing staggered with respect to said first phasing.

12. A video tape recorder system as claimed in claim 11, wherein said second and third azimuth angles are of the same polarity as each other, but of different values.

13. A video tape recorder system as claimed in claim 8, further comprising:

means for retrieving said first sub-Nyquist sampled luminance signal from said first subtrack, which means includes said first plurality of heads used as playback heads; and means for retrieving said second sub-Nyquist sampled luminance signal from said second subtrack, which means includes said second plurality of heads used as playback heads.

14. A recording circuit for a video tape recorder system, said recording circuit comprising:

means for providing a video signal having a luminance signal and a chrominance signal;

means for generating first and second modulated signals descriptive of said luminance signal, each having frequencies extending over a first frequency band, wherein said first and second modulated signals generating means comprises:
sampler means for sampling said luminance signal according to a first sampling clock signal at least at a Nyquist rate to provide an integral number of samples per scanning line, for enabling alternate selection of one of a first set of successive alternate samples and a second set of successive intervening samples of said luminance signal, and for generating first and second sub-Nyquist sampled luminance signals;
a first modulator for generating said first modulated signal by modulating a first luminance carrier in accordance with said first sub-Nyquist sampled luminance signal,
a second modulator for generating said second modulated signal by modulating a second luminance carrier in accordance with said second sub-Nyquist sampled luminance signal; and
said sampler means comprising:
a sampling circuit for sampling said luminance signal according to said first sampling clock signal at a 10 MHz rate to provide said integral number of samples per scanning line;
a frequency divider for providing a second sampling clock signal at approximately 5 MHz rate by dividing said first sampling clock signal in half;
a frame counter responsive to vertical synchronizing pulses, for counting an integral number of frames modulo-two;
a scan line counter responsive to horizontal synchronizing pulses, for counting an integral number of horizontal scan lines modulo-two;
a modulo-two adder responsive to the modulo-two frame count, the modulo-two scan line count, and said second sampling clock signal, for providing a control signal; and
a multiplexor for generating said first and said second sub-Nyquist sampled luminance signals by alternate selection of one of said first set of successive alternate samples and said second set of successive intervening samples of said luminance signal in accordance with said control signal;
means for generating third and fourth modulated signals descriptive of said chrominance signal, each having frequencies extending over a second frequency band separate from said first frequency band, each of said third and fourth modulated signals exhibiting respective amplitude variations that are equal in amplitude and opposite in phase;
means for combining said first modulated signal with said third modulated signal for generating a first frequency-multiplexed signal;
means for combining said second modulated signal with said fourth modulated signal for generating a second frequency-multiplexed signal;
recording means for helically recording a plurality of field tracks, said recording means of a type for simultaneously recording the first frequency-multiplexed signal on a first subtrack of each field track of the video signal using a first even-numbered plurality of heads and recording the second frequency-multiplexed signal on a second subtrack of each said field track using a second even-numbered plurality of heads, said first and second subtracks each having a respective width one-half the width of the field track, said first plurality of heads being mounted with regular spacing around the rim of a headwheel with their gaps alternately set to a first azimuth angle and to a second azimuth angle, and said second plurality of heads being mounted with regular spacing around the rim of said headwheel with their gaps alternately set to a third azimuth angle and to a fourth azimuth angle.

15. A recording circuit as claimed in claim 14, wherein said first and second azimuth angles are opposite to each other as measured respective to a perpendicular to the direction of said field tracks, and wherein said third and said fourth azimuth angles each differ from both said first and said second azimuth angles.

16. A recording circuit as claimed in claim 15, wherein said third and said fourth azimuth angles are opposite to each other as measured respective to a perpendicular to the direction of said field tracks.

17. A recording circuit as claimed in claim 14, wherein said first and second azimuth angles are opposite to each other as measured respective to a perpendicular to the direction of said field tracks, wherein said third and said fourth azimuth angles are opposite to each other as measured respective to a perpendicular to the direction of said field tracks, wherein the polarities of said first and second azimuth angles alternate from field to field in a first phasing, and wherein the polarities of said third and fourth azimuth angles alternate from field to field in a second phasing staggered with respect to said first phasing.

18. A recording circuit as claimed in claim 14, wherein said second and third azimuth angles are of the same polarity as each other, but of different values.

19. A recording circuit as claimed in claim 14, in combination with:
means for reproducing said first frequency-multiplexed signal from the first subtrack of a field track;
means for reproducing said second frequency-multiplexed signal from the second subtrack of the field track;
means for separating said first and second modulated signals from said first and second frequency-multiplexed signals;
means for demodulating said first and second modulated signals;
means for regenerating said luminance signal in combined response to the results of demodulating said first and second modulated signals;
means for separating said third and fourth modulated signals from said first and second frequency-multiplexed signals; and
means for regenerating said chrominance signal in combined response to the separated said third and fourth modulated signals.

20. A video tape recorder system for recording magnetic responses to a video signal in a magnetic recording medium, on field tracks with a field track width, said video signal being descriptive of line by line scanning of a television image field at a line scan rate, the successive scanning lines of each television image field being identified by consecutive ordinal numbers, and successive television image frames being identified by consecutive ordinal numbers, said video tape recorder system comprising:
chrominance signal converting means for generating by downconversion from a chrominance signal component of said video signal, a first color-under signal and a second color-under signal in opposite phasing to each other;

sampling means for sampling a luminance signal component of the video signal according to a first sampling clock signal supplied at a rate at least the Nyquist rate for said luminance signal component, but not as much as twice the Nyquist rate, to obtain an integral number of samples per scanning line which samples are identified by consecutive ordinal numbers beginning with first, and ones of said samples identified by the same ordinal number being arranged within said television image frames in a line transverse to the nominal direction of said scanning lines;

means included within said sampling means, separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

means included within said sampling means, separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal;

a first modulator for generating a first modulated signal having frequencies above those of said first color-under signal, said first modulated signal being modulated in accordance with said first sub-Nyquist sampled luminance signal;

a second modulator for generating a second modulated signal having frequencies above those of said second color-under signal, said second modulated signal being modulated in accordance with said second sub-Nyquist second luminance signal;

means combining said first sub-Nyquist sampled luminance signal with said first color-under signal for generating a first frequency-multiplexed signal;

means combining said second sub-Nyquist sampled luminance signal with said second color-under signal for generating a second frequency-multiplexed signal; and recording means for simultaneously recording the first frequency-multiplexed signal on a first subtrack of each field track of the video signal using a first even-numbered plurality of heads and recording the second frequency-multiplexed signal on a second subtrack of each said field track using a second even-numbered plurality of heads, said first and second subtracks each having a respective width one-half the width of the field track, said first plurality of heads being mounted with regular spacing around the rim of a headwheel with their gaps alternately set to a first azimuth angle and to a second azimuth angle, and said second plurality of heads being mounted with regular spacing around the rim of said headwheel with their gaps alternately set to a third azimuth angle and to a fourth azimuth angle.

21. A method of recording a video signal on a field track with a field track width in a video tape recording system, said video signal being descriptive of line by line scanning of a television image field at a line scan rate, the successive scanning lines of each television image field being identified by consecutive ordinal numbers, and successive television image frames being identified by consecutive ordinal numbers, said method comprising the steps of:

sampling a luminance signal component of the video signal at a rate at least the Nyquist rate for said luminance signal component, but not as much as twice the Nyquist rate, thereby to obtain an integral number of samples per scanning line which samples are identified by consecutive ordinal numbers beginning with first, and ones of said samples identified by the same ordinal number being arranged within said television image frames in a line transverse to the nominal direction of said scanning lines;

separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal;

recording on a first subtrack of the field track having a width half the width of said field track, using a first even-numbered plurality of heads mounted with regular spacing around the rim of a headwheel with their gaps alternately set to a first azimuth angle and to a second azimuth angle for recording in accordance with said first sub-Nyquist sampled luminance signal; and recording on a second subtrack of the field track having a width half the width of said field track, at the same time as recording on the first subtrack of said field track, using a second even-numbered plurality of heads mounted with regular spacing around the rim of said headwheel with their gaps alternately set to a third azimuth angle and to a fourth azimuth angle for recording in accordance with said second sub-Nyquist sampled luminance signal.

22. The method of claim 21, further comprising the further steps of:

retrieving the first sub-Nyquist sampled luminance signal from the first subtrack; and retrieving the second sub-Nyquist sampled luminance signal from the second subtrack at the same time as the first sub-Nyquist sampled luminance signal is retrieved from the first subtrack.

23. A method of transmitting respective portions of a luminance signal component of a video signal, comprising the steps of:

sampling the luminance signal component of said video signal having respective portions simultaneously transmitted through respective first and second transmission channels subject to similar respective delays transmission of said transmitted portions being done in such manner that said portions of said luminance signal component of a video signal can be rejoined despite occurrence of time-base instability in said respective delays successive television image frames of which video channel are identified by consecutive ordinal numbers said sampling being at a rate at least the Nyquist rate for said luminance signal, but not as much as twice the Nyquist rate, thereby to obtain an integral number of samples per scanning line which samples are identified by consecutive ordinal numbers beginning with first, the scanning lines within each of a succession of television frames being identified by consecutive ordinal numbers beginning with first, and successive television image frames being identified by consecutive ordinal numbers modulo-two, ones of said samples identified by the same ordinal number being arranged within said television frames in a line transverse to the nominal direction of said scanning lines;

separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal; and simultaneously transmitting said first sub-Nyquist sampled luminance signal through said first transmission channel and said second sub-Nyquist sampled luminance signal through said second transmission channel, parallel in time rather than staggered in time, for making the effects of said time-base instability on said first sub-Nyquist sampled luminance signal and on said second sub-Nyquist sampled luminance signal similar.

24. A method for recording a video signal having a luminance signal component, said method comprising the steps of:

sampling the luminance signal component of said video signal at a rate at least the Nyquist rate for said luminance signal component, but not as much as twice the Nyquist rate, thereby to obtain an integral number of samples per scanning line which samples are identified by consecutive ordinal numbers beginning with first, the scanning lines within each said television image frame being identified by consecutive ordinal numbers beginning with first, and successive television image frames being identified by consecutive ordinal numbers modulo-two, ones of said samples identified by the same ordinal number being arranged within said television frames in a line transverse to the nominal direction of said scanning lines;

separating odd-numbered samples from odd-numbered scan lines and even-numbered samples from even-numbered scan lines as those samples sequentially occur during scanning of each odd-numbered television image frame, and further separating even-numbered samples from odd-numbered scan lines and odd-numbered samples from even-numbered scan lines as those samples sequentially occur during scanning of each even-numbered television image frame, for generating a first sub-Nyquist sampled luminance signal;

separating odd-numbered samples from odd-numbered scan lines and even-numbered samples from even-numbered scan lines as those samples sequentially occur during scanning of each even-numbered television image frame, and further separating even-numbered samples from odd-numbered scan lines and odd-numbered samples from even-numbered scan lines as those samples sequentially occur during scanning of each odd-numbered television image frame, for generating a second sub-Nyquist sampled luminance signal;

generating by downconversion from a chrominance signal component of said video signal, a first color-under signal and a second color-under signal in opposite phasing to each other;

combining said first color-under signal and said first sub-Nyquist sampled luminance signal, thereby forming a first frequency-multiplexed signal;

combining said second color-under signal and said second sub-Nyquist sampled luminance signal, thereby forming a second frequency-multiplexed signal; and recording said first frequency-multiplexed signal on a first subtrack of each successive field track in a magnetic recording medium, using a first even-numbered plurality of heads mounted with regular spacing around the rim of a headwheel with their gaps alternately set to a first azimuth angle and to a second azimuth angle; and recording said second frequency-multiplexed signal on a second subtrack of each said successive field track in said magnetic recording medium, using a second even-numbered plurality of heads mounted with regular spacing around the rim of said headwheel with their gaps alternately set to a third azimuth angle and to a fourth azimuth angle in a second gap phasing sequence, said first and second subtracks each having widths one-half the width of said field tracks.

25. The recording method of claim 24, included in a method for recording and playing back said video signal further comprising the steps of:

retrieving said first frequency-multiplexed signal from the first subtrack using an even-numbered plurality of heads mounted with regular spacing around the rim of a headwheel with their gaps alternately set to said first azimuth angle and to said second azimuth angle; and retrieving said second frequency-multiplexed signal from the second subtrack using an even-numbered plurality of heads mounted with regular spacing around the rim of said headwheel with their gaps alternately set to said third azimuth angle and to said fourth azimuth angle.

* * * * *